US012222921B1

(12) United States Patent
Vaughan

(10) Patent No.: US 12,222,921 B1
(45) Date of Patent: *Feb. 11, 2025

(54) DATABASE MANAGEMENT TECHNIQUES FOR CONCURRENT WRITE REQUEST PROCESSING

(71) Applicant: Optum, Inc., Minnetonka, MN (US)

(72) Inventor: Paul W. Vaughan, Austin, TX (US)

(73) Assignee: Optum, Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,832

(22) Filed: Aug. 31, 2023

Related U.S. Application Data

(63) Continuation of application No. 18/240,617, filed on Aug. 31, 2023, now Pat. No. 12,111,813.

(60) Provisional application No. 63/374,291, filed on Sep. 1, 2022.

(51) Int. Cl.
*G06F 16/00* (2019.01)
*G06F 16/23* (2019.01)

(52) U.S. Cl.
CPC ...... *G06F 16/2308* (2019.01); *G06F 16/2358* (2019.01)

(58) Field of Classification Search
CPC ............. G06F 16/2343; G06F 16/2365; G06F 16/2308; G06F 16/2358
See application file for complete search history.

(56) References Cited

U.S. PATENT DOCUMENTS

| 6,078,982 A * | 6/2000 | Du ...................... G06F 16/2343 710/200 |
| 7,146,366 B2 | 12/2006 | Hinshaw et al. |
| 7,725,470 B2 | 5/2010 | Richards et al. |
| 9,202,084 B2 | 12/2015 | Moore |
| 2012/0233409 A1* | 9/2012 | Ross ..................... G06F 12/084 711/135 |
| 2015/0089156 A1* | 3/2015 | Clohset .................. G06T 15/06 711/141 |

(Continued)

FOREIGN PATENT DOCUMENTS

CN 110928489 A * 3/2020 ............ G06F 3/0611

(Continued)

OTHER PUBLICATIONS

"Advancing Health Equity In Chronic Disease Prevention and Management," National Center for Chronic Disease Prevention and Health Promotion (NCCDPHP), Centers For Disease Control and Prevention, Dec. 8, 2022, (3 pages), (article), [Retrieved from the Internet Dec. 5, 2023] <URL: https://www.cdc.gov/chronicdisease/healthequity/index.htm>.

(Continued)

*Primary Examiner* — Syed H Hasan
(74) *Attorney, Agent, or Firm* — Alston & Bird LLP

(57) ABSTRACT

Various embodiments of the present invention provide methods, apparatuses, systems, computing devices, computing entities, and/or the like for facilitating efficient and effective execution of database management operations. For example, various embodiments of the present invention describe techniques for performing one or more database update operations given a concurrent write request group for a database using P concurrent request processor computing nodes, a match result serialization queue, and a centralized match result serializer computing node.

20 Claims, 8 Drawing Sheets

(56) References Cited

U.S. PATENT DOCUMENTS

2020/0050601 A1\* 2/2020 Avni .................. G06F 9/467
2021/0117425 A1 4/2021 Rao et al.

OTHER PUBLICATIONS

"Read Isolation, consistency, and Recency," MongoDB Manual, (40 pages), (Year: 2023), [Retrieved from the Internet Dec. 5, 2023] <URL: https://www.mongodb.com/docs/manual/core/read-isolation-consistency-recency/>.

Efthymiou, Vasilis. "Entity Resolution In The Web Of Data," PhD Dissertation, University of Crete, Sep. 2017, (141 pages), available online: https://www.researchgate.net/profile/Vasilis-Efthymiou/publication/325335421_Entity_Resolution_in_the_Web_of_Data/links/5b06896c0f7e9b1ed7e84b64/Entity-Resolution-in-the-Web-of-Data.pdf.

Egede, Leonard E. "Race, Ethnicity, Culture, and Disparities In Health Care," Journal of General Internal Medicine, vol. 21, No. 6, pp. 667-669, Jun. 2006, DOI: 10.1111/j.1525-1497.2006.0512.x, PMCID: PMC1924616, PMID: 16808759.

U.S. Appl. No. 18/240,617, filed Aug. 31, 2023, (Unpublished), Applicant: Optum, Inc.

\* cited by examiner

DATABASE QUERY INTERFACE

Enter Name: Billy Johns, Sir
Enter DOB: 4/25/1954

RUN QUERY

Related Records Include:

Sisters of Mercy East; 12; Billy Johns, Sr; 467 Mercer Street; 818-456-7890; M; 4/25/1954

Regional Clinic; 3; Bill Johns; 467 Mercer Street; 818-456-7890; M; 4/25/1954

Pain in the Back Chiropracty; 41; John Bill; 467 Mercer Street; 818-456-7890; M; 4/25/1954

United Health Care; 64; Bill Johns; 467 Mercer Street; 818-456-7890; M; 4/25/1950

Sisters of Mercy ED; 34; Bill Johns, Jr; 467 Mercer Street; 818-456-7890; M; 9/25/1992

FIG. 8

DATABASE MANAGEMENT TECHNIQUES FOR CONCURRENT WRITE REQUEST PROCESSING

CROSS-REFERENCE TO RELATED APPLICATIONS

This application claims the benefit of U.S. patent application Ser. No. 18/240,617 filed on Aug. 31, 2023, and U.S. Provisional Patent Application Ser. No. 63/374,291 filed on Sep. 1, 2022, both of which are incorporated herein by reference in their entireties, including any figures, tables, drawings, and appendices.

BACKGROUND

Various embodiments of the present invention address technical challenges related to performing efficient and effective execution of database management operations.

BRIEF SUMMARY

In general, various embodiments of the present invention provide methods, apparatuses, systems, computing devices, computing entities, and/or the like for facilitating efficient and effective execution of database management operations. For example, various embodiments of the present invention describe techniques for performing one or more database update operations given a concurrent write request group for a database using P concurrent request processor computing nodes, a match result serialization queue, and a centralized match result serializer computing node.

In accordance with one aspect, a method includes: for each concurrent write request in the concurrent write request group: (i) determining a selected request processor computing node of a plurality of concurrent request processor computing nodes for the concurrent write request, (ii) generating, using the selected request processor computing node, a concurrent match result determination for the concurrent write request, wherein the concurrent match result determination describes a proposed database aggregate for the concurrent write request, and (iii) in response to generating the match result determination, generating an unprocessed match result entry for the concurrent match result determination in a match result serialization queue, wherein: (a) the match result serialization queue describes a serialization ordering of one or more unprocessed match result entries, (b) each unprocessed match result entry corresponds to an unprocessed concurrent match result determination that has not been processed, and (c) processing a particular unprocessed concurrent match result determination comprises generating a match result validation determination for the particular unprocessed concurrent match result determination, and during each database update iteration, performing the one or more database update operations using the match result serialization queue.

In accordance with another aspect, an apparatus comprising at least one processor and at least one memory including program code, the at least one memory and the program code configured to, with the processor, cause the apparatus to at least: for each concurrent write request in the concurrent write request group: (i) determine a selected request processor computing node of a plurality of concurrent request processor computing nodes for the concurrent write request, (ii) generate, using the selected request processor computing node, a concurrent match result determination for the concurrent write request, wherein the concurrent match result determination describes a proposed database aggregate for the concurrent write request, and (iii) in response to generating the match result determination, generate an unprocessed match result entry for the concurrent match result determination in a match result serialization queue, wherein: (a) the match result serialization queue describes a serialization ordering of one or more unprocessed match result entries, (b) each unprocessed match result entry corresponds to an unprocessed concurrent match result determination that has not been processed, and (c) processing a particular unprocessed concurrent match result determination comprises generating a match result validation determination for the particular unprocessed concurrent match result determination; and during each database update iteration, perform the one or more database update operations using the match result serialization queue.

In accordance with yet another aspect, a computer program product comprising at least one non-transitory computer-readable storage medium having computer-readable program code portions stored therein, the computer-readable program code portions configured to: for each concurrent write request in the concurrent write request group: (i) determine a selected request processor computing node of a plurality of concurrent request processor computing nodes for the concurrent write request, (ii) generate, using the selected request processor computing node, a concurrent match result determination for the concurrent write request, wherein the concurrent match result determination describes a proposed database aggregate for the concurrent write request, and (iii) in response to generating the match result determination, generate an unprocessed match result entry for the concurrent match result determination in a match result serialization queue, wherein: (a) the match result serialization queue describes a serialization ordering of one or more unprocessed match result entries, (b) each unprocessed match result entry corresponds to an unprocessed concurrent match result determination that has not been processed, and (c) processing a particular unprocessed concurrent match result determination comprises generating a match result validation determination for the particular unprocessed concurrent match result determination; and during each database update iteration, perform the one or more database update operations using the match result serialization queue.

In accordance with one aspect, a method includes: identifying a match result serialization queue, wherein: (i) the match result serialization queue describes a serialization ordering of one or more unprocessed match result entries, (ii) each unprocessed match result entry corresponds to an unprocessed concurrent match result determination that has not been processed, and (iii) processing a particular unprocessed concurrent match result determination comprises generating a match result validation determination for the particular unprocessed concurrent match result determination; and performing the one or more database update operations using the match result serialization queue, comprising, for each selected unprocessed match result entry that is selected from the one or more unprocessed match result entries described by the match result serialization queue in accordance with the serialization ordering: (i) identifying a recently-processed match result list comprising one or more recently-processed match result entries, wherein: (a) each recently-processed match result entry corresponds to a recently-processed match result determination, and (b) each recently-processed match result determination has been assigned an affirmative match result validation during a defined recency period before a current processing time, (ii)

generating, based at least in part on whether the selected unprocessed match result entry matches at least one of the one or more recently-processed match result entries and using a centralized match result serializer computing node, a serialized match result determination for the selected unprocessed match result entry, wherein the recently-processed match result list is stored on a local storage medium of the centralized match result serializer computing node, (iii) generating, based at least in part on the serialized match result determination for the selected unprocessed match result entry, the match result validation determination for the selected unprocessed match result entry, and (iv) in response to determining that the match result validation determination for the selected unprocessed match result entry is a negative match result validation determination: (a) adding a new concurrent write request for the selected unprocessed match result entry to the concurrent write request group, and (b) removing the selected unprocessed match result entry from the one or more unprocessed match result entries as described by the match result serialization queue.

In accordance with another aspect, an apparatus comprising at least one processor and at least one memory including program code, the at least one memory and the program code configured to, with the processor, cause the apparatus to at least: identify a match result serialization queue, wherein: (i) the match result serialization queue describes a serialization ordering of one or more unprocessed match result entries, (ii) each unprocessed match result entry corresponds to an unprocessed concurrent match result determination that has not been processed, and (iii) processing a particular unprocessed concurrent match result determination comprises generating a match result validation determination for the particular unprocessed concurrent match result determination; and performing the one or more database update operations using the match result serialization queue, comprising, for each selected unprocessed match result entry that is selected from the one or more unprocessed match result entries described by the match result serialization queue in accordance with the serialization ordering: (i) identifying a recently-processed match result list comprising one or more recently-processed match result entries, wherein: (a) each recently-processed match result entry corresponds to a recently-processed match result determination, and (b) each recently-processed match result determination has been assigned an affirmative match result validation during a defined recency period before a current processing time, (ii) generating, based at least in part on whether the selected unprocessed match result entry matches at least one of the one or more recently-processed match result entries and using a centralized match result serializer computing node, a serialized match result determination for the selected unprocessed match result entry, wherein the recently-processed match result list is stored on a local storage medium of the centralized match result serializer computing node, (iii) generating, based at least in part on the serialized match result determination for the selected unprocessed match result entry, the match result validation determination for the selected unprocessed match result entry, and (iv) in response to determining that the match result validation determination for the selected unprocessed match result entry is a negative match result validation determination: (a) adding a new concurrent write request for the selected unprocessed match result entry to the concurrent write request group, and (b) removing the selected unprocessed match result entry from the one or more unprocessed match result entries as described by the match result serialization queue.

In accordance with yet another aspect, a computer program product comprising at least one non-transitory computer-readable storage medium having computer-readable program code portions stored therein, the computer-readable program code portions configured to: identifying a match result serialization queue, wherein: (i) the match result serialization queue describes a serialization ordering of one or more unprocessed match result entries, (ii) each unprocessed match result entry corresponds to an unprocessed concurrent match result determination that has not been processed, and (iii) processing a particular unprocessed concurrent match result determination comprises generating a match result validation determination for the particular unprocessed concurrent match result determination; and performing the one or more database update operations using the match result serialization queue, comprising, for each selected unprocessed match result entry that is selected from the one or more unprocessed match result entries described by the match result serialization queue in accordance with the serialization ordering: (i) identifying a recently-processed match result list comprising one or more recently-processed match result entries, wherein: (a) each recently-processed match result entry corresponds to a recently-processed match result determination, and (b) each recently-processed match result determination has been assigned an affirmative match result validation during a defined recency period before a current processing time, (ii) generating, based at least in part on whether the selected unprocessed match result entry matches at least one of the one or more recently-processed match result entries and using a centralized match result serializer computing node, a serialized match result determination for the selected unprocessed match result entry, wherein the recently-processed match result list is stored on a local storage medium of the centralized match result serializer computing node, (iii) generating, based at least in part on the serialized match result determination for the selected unprocessed match result entry, the match result validation determination for the selected unprocessed match result entry, and (iv) in response to determining that the match result validation determination for the selected unprocessed match result entry is a negative match result validation determination: (a) adding a new concurrent write request for the selected unprocessed match result entry to the concurrent write request group, and (b) removing the selected unprocessed match result entry from the one or more unprocessed match result entries as described by the match result serialization queue.

BRIEF DESCRIPTION OF THE DRAWINGS

Figure 1:
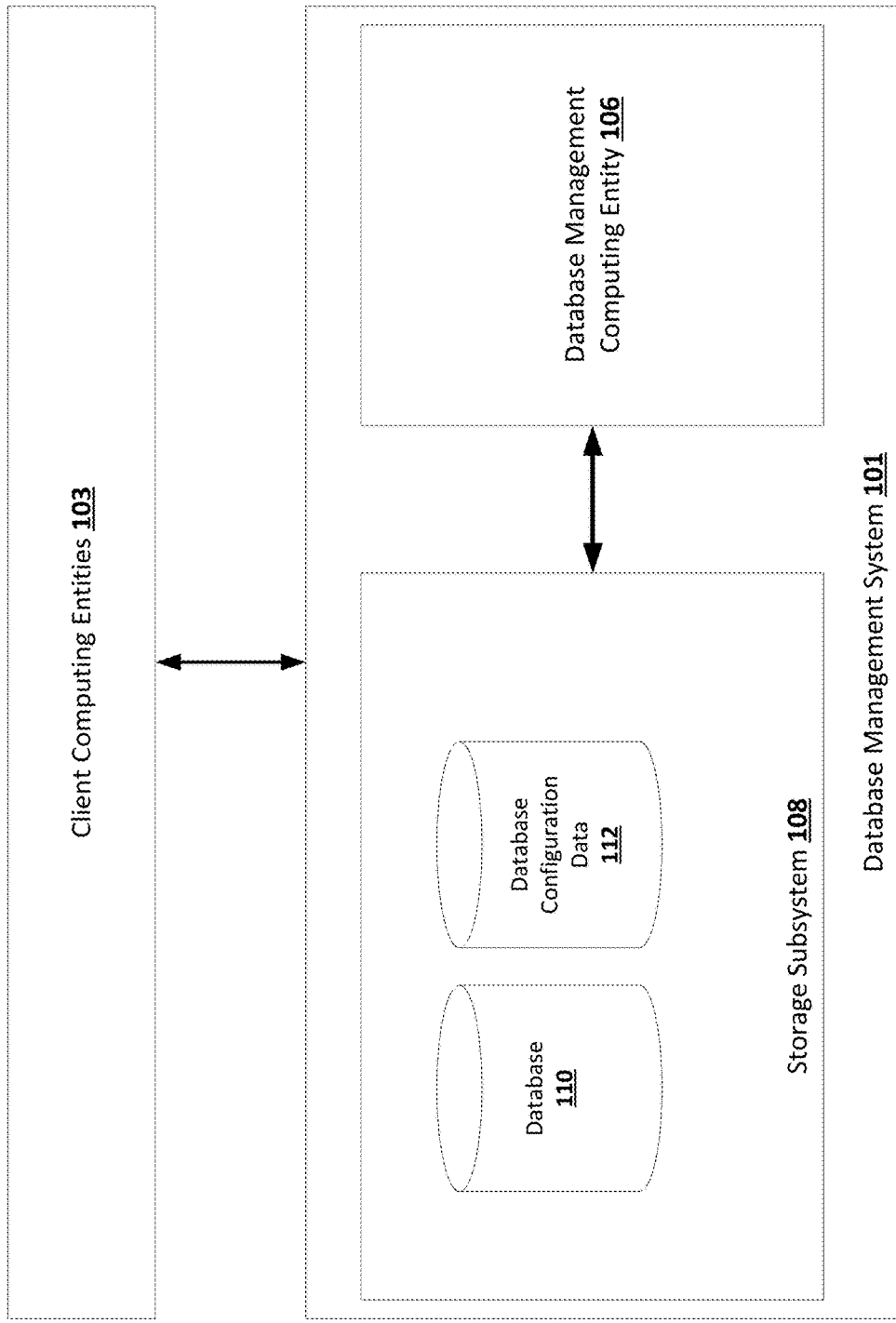

Having thus described the invention in general terms, reference will now be made to the accompanying drawings, which are not necessarily drawn to scale, and wherein:

FIG. 1 provides an exemplary overview of a system that can be used to practice embodiments of the present invention.

Figure 2:
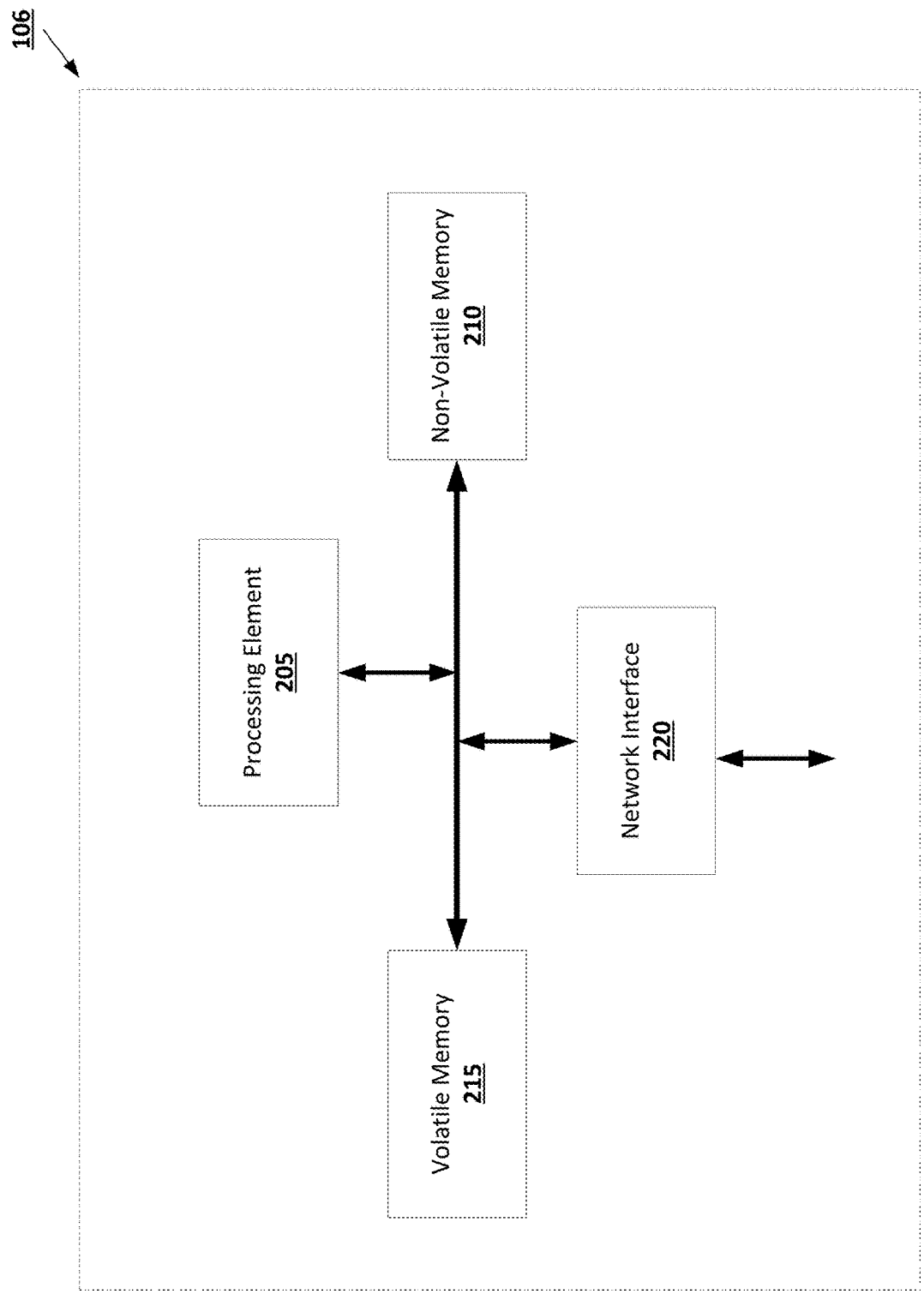

FIG. 2 provides an example database management computing entity in accordance with some embodiments discussed herein.

Figure 3:
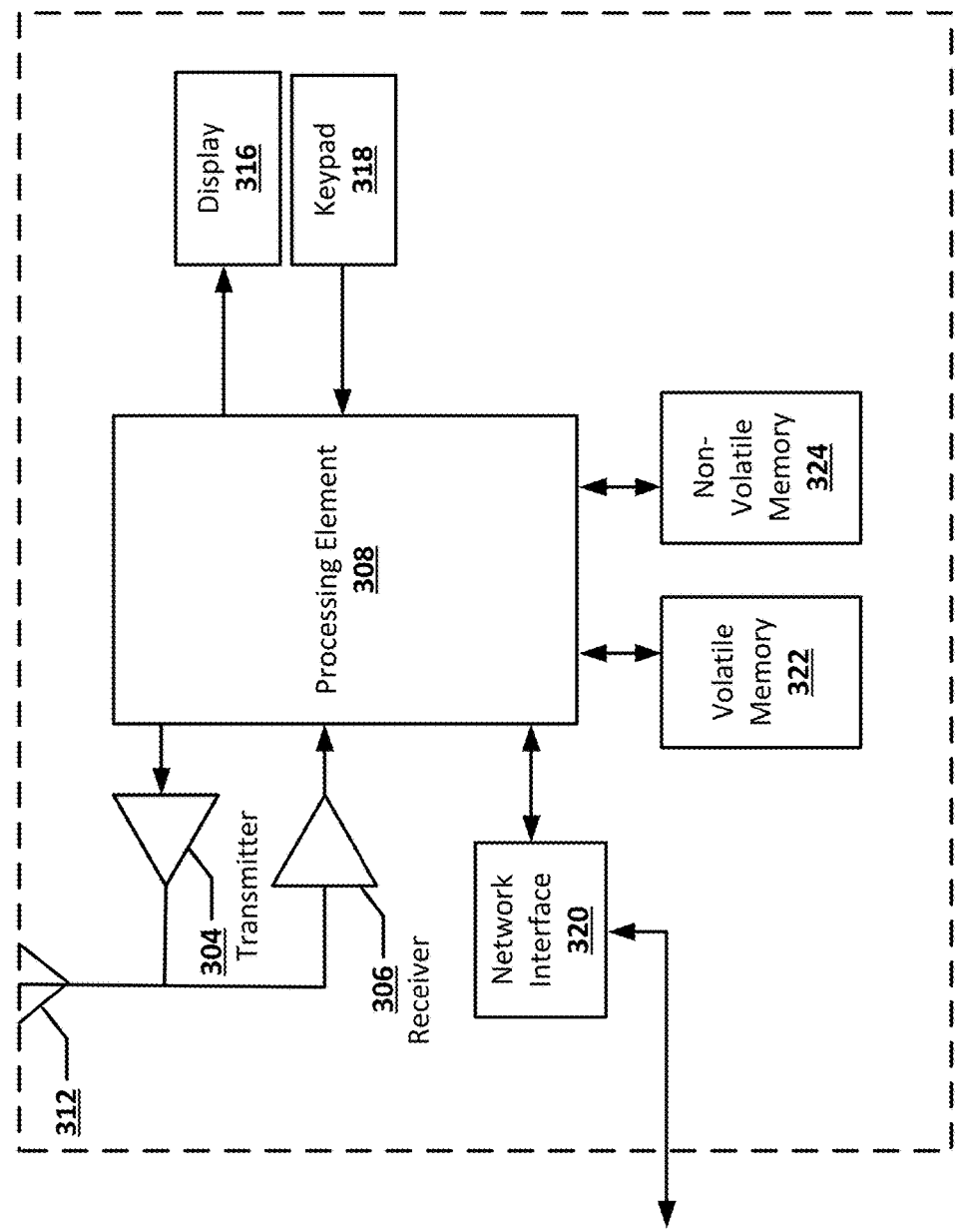

FIG. 3 provides an example client computing entity in accordance with some embodiments discussed herein.

Figure 4:
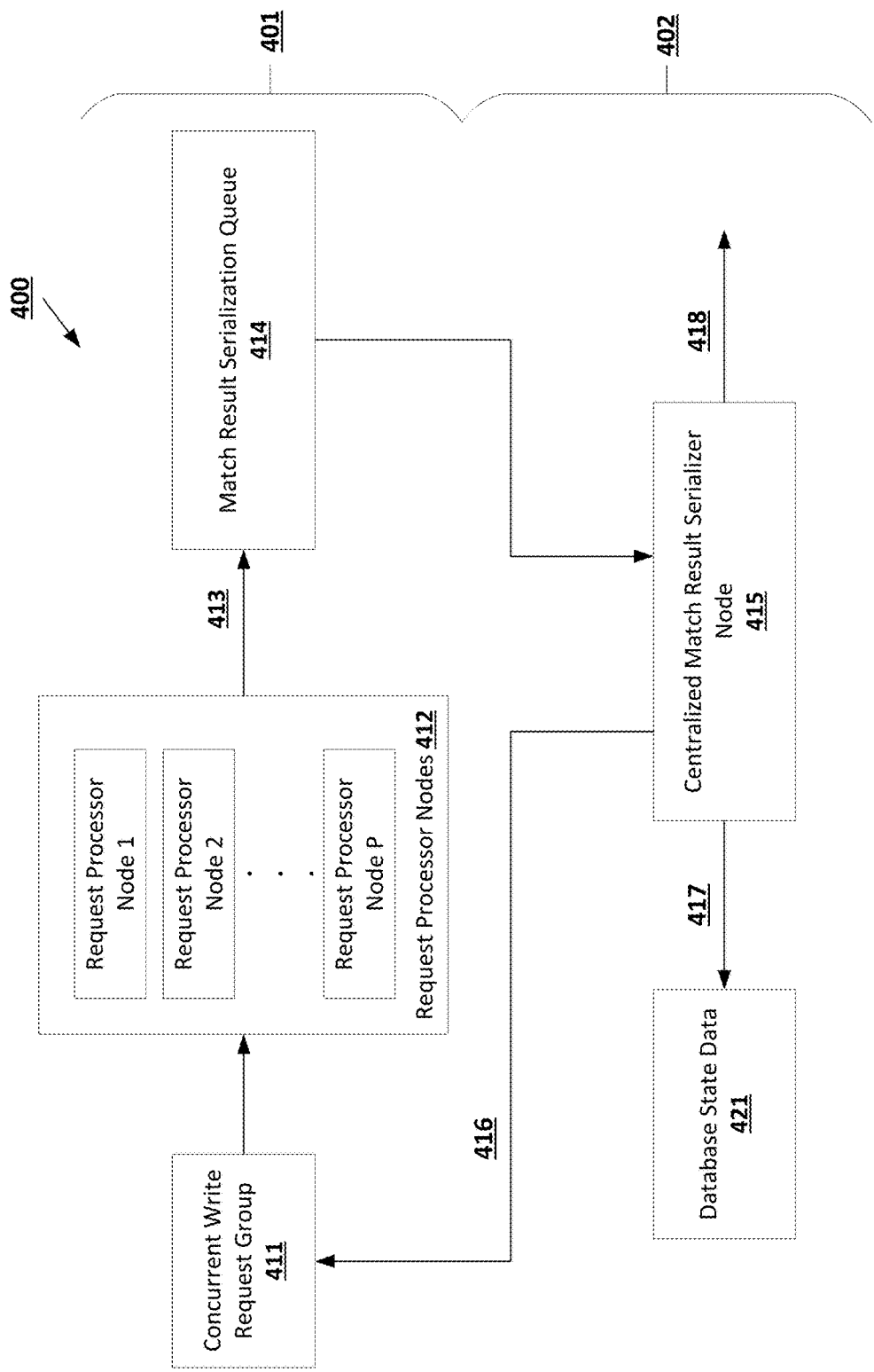

FIG. 4 is a data flow diagram of an example process for performing database update operations in accordance with some embodiments discussed herein.

Figure 5:
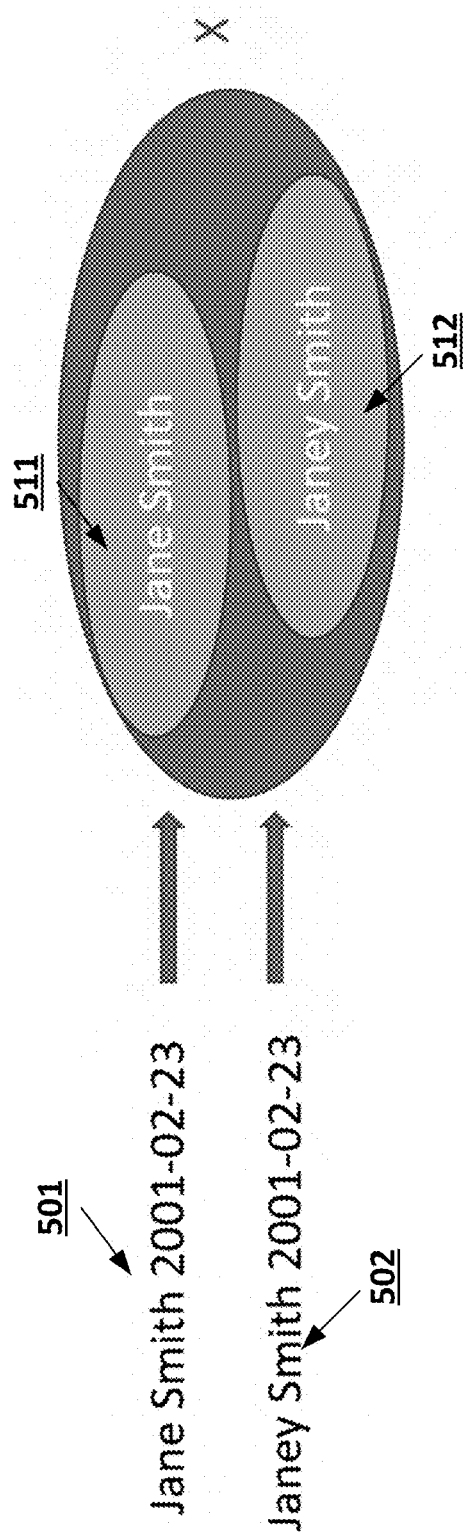

FIG. 5 provides an operational example of a missed match database inconsistent state scenario in accordance with some embodiments discussed herein.

Figure 6:
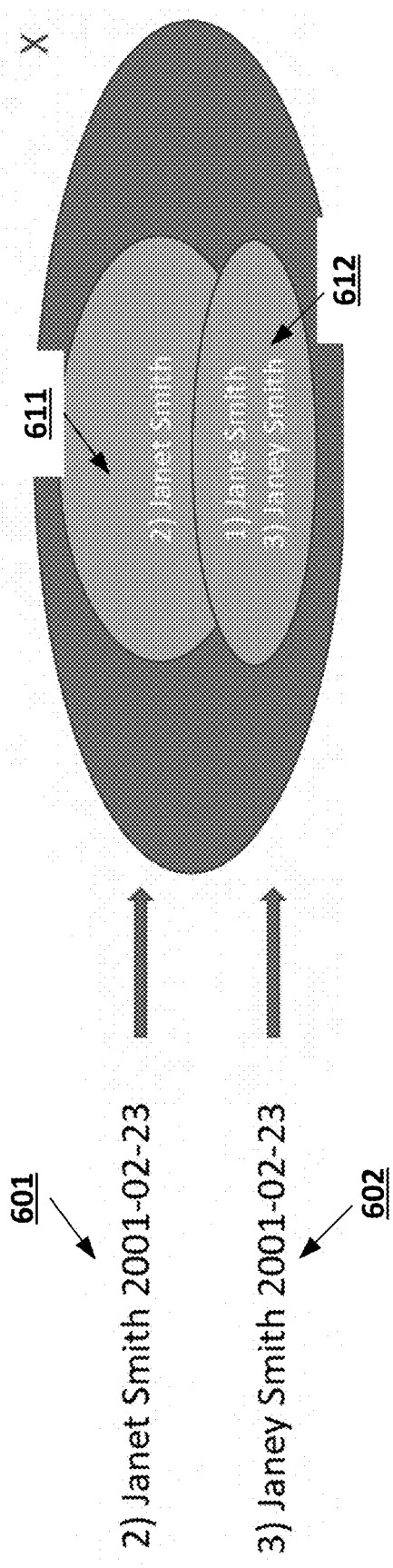

FIG. 6 provides an operational example of a conflicting match database inconsistent state scenario in accordance with some embodiments discussed herein.

Figure 7:
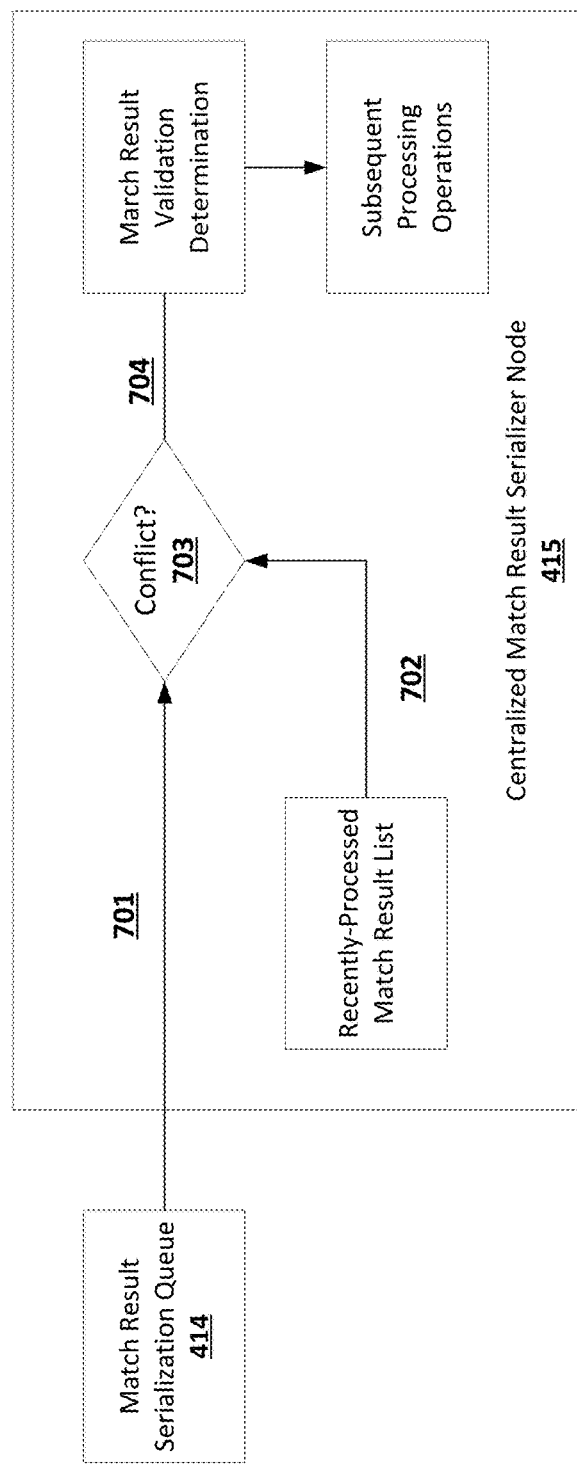

FIG. 7 is a data flow diagram of an example process for generating a match result validation determination for a write request in accordance with some embodiments discussed herein.

FIG. 8 provides an operational example of a database query result user interface 800 in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL ADVANTAGES

Various embodiments of the present invention improve efficiency and scalability of performing parallel/concurrent write request processing/matching while maintaining database state consistency. As described herein, while parallel/concurrent write request processing/matching has advantages when it comes to increasing write request processing speed (which is especially significant for real-time and/or near-real-time database update applications), it poses challenges related to maintaining database state consistency. One solution to this challenge is to use database management systems that enable transaction management to ensure transactional serialization. Examples of such database management systems include various relational database management systems (e.g., Oracle, PostgreSQL, and/or the like) that use conventional relational database locking by preventing conflicting decisions via locking record rows and preventing missed matches by locking index locations. However, such solutions introduce deadlock problems. Moreover, database management systems that enable transaction management to ensure transactional serialization are typically limited in terms of performance efficiency and scalability, which often makes the database a key bottleneck for complex software applications. Because of this, many database management systems, such as various document-based database management systems, such as DynamoDB and MongoDB, may limit serialization-based transaction management (e.g., by limiting the number of items that may be updated, their total size, etc.). This means that, many database management systems that offer many operational efficiency and scalability advantages suffer from substantial technical challenges related to maintaining database state consistency when it comes to parallel/concurrent write request processing/matching.

To address the above-noted challenges associated with efficiency and scalability of performing parallel/concurrent write request processing/matching while maintaining database state consistency, various embodiments of the present invention enable using P concurrent request processor computing nodes to generate concurrent match result determinations for concurrent write requests in a concurrent write request groups, where the concurrent match result determinations are then serialized using a match result serialization queue and processed using a centralized match result serializer computing node to generate match result validation determinations for the concurrent match result determinations. The concurrent match result determination for a write request may describe a computed determination about whether the write request corresponds to one or more database records and/or one or more database aggregates described by the database state data of a corresponding database, where the computed determination is determined using a particular request processor computing node of P concurrent request processor computing nodes. In some embodiments, the concurrent match result determination for a write request describes a proposed database aggregate for the write request. A match result serialization queue may describe a serialization ordering of a set of unprocessed match result entries. In some embodiments, when a concurrent match result determination is generated for a write request, data associated with the concurrent match result determination is added to a match result serialization queue using an unprocessed match result entry for the write request.

Accordingly, in some embodiments: (i) the match result serialization queue describes a serialization ordering of one or more unprocessed match result entries, (ii) each unprocessed match result entry corresponds to an unprocessed concurrent match result determination that has not been processed, and (iii) processing a particular unprocessed concurrent match result determination comprises generating a match result validation determination for the particular unprocessed concurrent match result determination. In some embodiments, a centralized match result serializer computing node is configured to, during each processing iteration: (i) select/retrieve a selected unprocessed match result entry from the one or more unprocessed match result entries described by the match result serialization queue in accordance with the serialization ordering, (ii) generate a match result validation determination for the selected unprocessed match result entry, and (iii) perform one or more subsequent processing operations corresponding to the selected unprocessed match result entry based at least in part on the match result validation determination. In some embodiments, a match result validation determination for an unprocessed write request entry describes a computed determination about whether the concurrent match result determination for the unprocessed write request entry is valid in light of concurrent write requests that were likely not reflected in the database state data at the time when the concurrent match result determination was generated. Accordingly, in some embodiments, the match result validation determination for an unprocessed write request entry enables performing cross-record matching operations across concurrently-processed write requests to detect potential occurrences of database inconsistency scenarios that may arise when two matching write requests are concurrently processed, such as missed matched scenarios and conflicting match scenarios as described in greater detail above.

II. DEFINITIONS OF CERTAIN TERMS

The term "database" may refer to a data construct that is configured to describe a collection of one or more structured data values that are stored in accordance with one or more data models. Examples of databases include a collection of one or more structured data values, such as one or more structured data values stored in accordance with a relational data model, one or more structured data values stored in accordance with an object-oriented data model, one or more structured data values stored in accordance with an object-relational data model, one or more structured data values stored in accordance with a hierarchical data model, one or more structured data values stored in accordance with a graph-based data model, and/or the like. In some embodiments, the structured data values of a database are stored on one computing entity. In some embodiments, the structured data values of a database are stored on multiple computing entities.

The term "database aggregate" may refer to a data construct that describes a set of database records that are assigned a golden identifier and are processed as matched database records by a database management system. In some embodiments, the database records of a database are matched (e.g., using one or more automated matching routines) in order to identify/detect cross-record aggregation relationships between sets of the database records and assign each identified set comprising database records that are determined to collectively have a cross-record aggregation relationship to a database aggregate. The database aggregates of a database may be described by the database state data for the database, where the database state data for a database may be used to perform one or more database management operations with respect to the database.

The term "concurrent write request group" may refer to a data construct that describes a group of database write requests that are concurrently processed, such that one concurrently-processed write request (referred to herein as a concurrent write request) is processed before the database state is modified in accordance with another concurrently-processed write request. Examples of write requests include a request to add a new database record to a database or a request to modify an existing database record of a database. In some embodiments, because one concurrent write request is processed before another the database state is modified in accordance with the other concurrent write request, if the two write requests satisfy a cross-record matching relationship (e.g., correspond to the same real-world identity) such that they should be both assigned to the same database aggregate, and if the underlying database does not perform transaction management via locking record rows (as is the case with many document-based databases such as MongoDB), then performing cross-record matching operations across the two database records based at least in part on the latest database state using concurrent/parallel database matching may be challenging, as the matching determination for one concurrent write request may be performed based at least in part on database states do not reflect the other concurrent write request.

The term "concurrent request processor computing node" may be a computing entity/device or a computer processor of a multi-processor computing entity/device that is configured to generate a concurrent match result determination for a particular write request. In some embodiments, a concurrent request processor computing node retrieves a write request from a set of concurrent write requests (e.g., a set of concurrent write requests associated with one or more concurrent write request groups), retrieves latest database state data associated with a database, and then generates the concurrent match result determination for the particular write request based at least in part on the data (e.g., content data, header metadata, and/or the like) associated with the particular write request and the latest database state data (e.g., data about latest database records of the database, latest database aggregates of the database, and/or the like). In some embodiments, to generate the concurrent match result determination for a particular write request, the concurrent request processor computing node uses one or more conventional cross-record matching functionalities, such as one or more conventional cross-record matching functionalities enable by a cross-record matching software library (e.g., the Scalable Complex Entity Partitioner (SCEPter) software library).

The term "concurrent match result determination" may refer to a data construct that describes a computed determination about whether a write request corresponds to one or more database records and/or one or more database aggregates described by the database state data of a corresponding database, where the computed determination is determined using a particular request processor computing node of/concurrent request processor computing nodes. In some embodiments, the concurrent match result determination for a write request describes a proposed database aggregate for the write request. In some of the noted embodiments, if a request processor computing node determines that the write request is not matched with any of the existing database records and/or with any of the existing database records of the database, then the concurrent match result determination for the write request may describe that the write request is associated with a proposed database aggregate that is a new database aggregate (i.e., a database aggregate that is not currently described by the database state data associated with the database). In some of the noted embodiments, if a request processor computing node determines that the write request is matched with an existing database record and/or with an existing database aggregate of the database, then the concurrent match result determination for the write request may describe that the write request is associated with a proposed database aggregate that corresponds to the existing database record and/or the existing database aggregate. In some embodiments, in addition to the proposed database aggregate for a write request, the concurrent match result determination for the write request describes the content data associated with the write request (e.g., content data associated with a new database record that the write request seeks to add, content data associated with modified database record fields that the write request seeks to integrate into a target database record, content data associated with an existing database record that the write request seeks to modify/change, and/or the like), metadata associated with the database records that the write request affects, data associated with the proposed database aggregate, data associated with the database records that are associated with the proposed database aggregate, and/or the like. In some embodiments, the concurrent match result determination for the write request describes one or more proposed database update operations that, if executed, modify database state data to reflect changes the proposed database aggregate, where the changes correspond to the write request content data. In some embodiments, during each processing iteration for a concurrent request processor computing node, the concurrent request processor computing node retrieves a write request from a centralized queue of unprocessed write requests (e.g., a queue that reflects the order in which the write requests are received). Moreover, in some embodiments, during each processing iteration for a concurrent request processor computing node, the concurrent request processor computing node accesses the database state data for an underlying database, where the database state data is stored in a non-local storage medium (e.g., database state data stored on a remote/non-local permeant storage medium). This means that the operations of concurrent request processor computing nodes likely incur a data retrieval latency that is associated with retrieving database state data from a non-local storage medium. However, the effect of this data retrieval latency on the overall write request processing pipeline is minimized because the concurrent request processor computing nodes execute cross-record matching threads in a parallelized/concurrent manner.

The term "match result serialization queue" may refer to a data construct that describes a serialization ordering of a set of unprocessed match result entries. In some embodiments, when a concurrent match result determination is generated for a write request, data associated with the concurrent match result determination is added to a match result serialization queue using an unprocessed match result entry for the write request. In some of the noted embodiments, once the unprocessed match result entry for a write request is added to the match result serialization queue, the unprocessed match result entry is maintained in the match result serialization queue until the write request is fully "processed," which includes generates a match result validation determination for the concurrent match result determination that is associated with the write request. Accordingly, the match result serialization queue may be associated with a set of unprocessed match result entries, where each of the unprocessed match result entry is associated with an unprocessed write request whose unprocessed concurrent match result determination has already been generated by a concurrent request processor computing node and describes data associated with the noted unprocessed concurrent match result determination. Accordingly, in some embodiments: (i) the match result serialization queue describes a serialization ordering of one or more unprocessed match result entries, (ii) each unprocessed match result entry corresponds to an unprocessed concurrent match result determination that has not been processed, and (iii) processing a particular unprocessed concurrent match result determination comprises generating a match result validation determination for the particular unprocessed concurrent match result determination.

The term "serialization order" may refer to a data construct that describes an imposed ordering on the unprocessed match result entries in a match result serialization queue. In some embodiments, being a queue, the match result serialization queue is associated with an ordering of its queue entries, which in this case are the match result entries. The ordering associated with the match result serialization queue is herein referred to as a serialization order, because the ordering effectively serializes concurrent match result determinations that are generated in a non-serial fashion. In other words, instead of imposing serial processing accordance the totality of a matching/aggregation-aware database update pipeline, various embodiments of the present invention impose serialization on a portion of the noted pipeline, thus reducing the negative efficiency, speed, and scalability downsides of serialized transactional management on the overall database management experience. In some embodiments, given a match result serialization queue that is associated with a set of unprocessed match result entries, the serialization order for the match result serialization queue is generated based at least in part on priority scores for unprocessed match result entries, where the priority score for a particular unprocessed match result entry is generated based at least in part on at least one of: (i) a temporal priority score for the particular unprocessed match result entry that is determined based at least in part on a generation time of the unprocessed match result entry, (ii) a size-based priority score for the particular unprocessed match result entry that is determined based at least in part on a count of database records associated with the proposed database aggregate for the corresponding unprocessed match result determination, and (iii) a group-based priority score for the particular unprocessed match result entry that is determined based at least in part on a priority score for the concurrent write request group that is associated with the corresponding write request for the particular unprocessed match result entry. For example, in some embodiments, the unprocessed match result entries for some current write request groups/populations are prioritized in the serialization order. As another example, in some embodiments, the unprocessed match result entries for "larger" database aggregates (as determined based at least in part on number of database records for database aggregates) are prioritized in the serialization order.

The term "centralized match result serializer computing node" may be a computing entity/device and/or a computer processor that is configured to, during each processing iteration: (i) select/retrieve a selected unprocessed match result entry from the one or more unprocessed match result entries described by the match result serialization queue in accordance with the serialization ordering, (ii) generate a match result validation determination for the selected unprocessed match result entry, and (iii) perform one or more subsequent processing operations corresponding to the selected unprocessed match result entry based at least in part on the match result validation determination. As described above, in some embodiments, given G concurrent write requests groups, each concurrent write request group is associated with a corresponding match result serialization queue, and once a particular concurrent match result determination for a particular write request is generated by a concurrent request processor computing node, an unprocessed match result entry for the particular concurrent match result determination is added to the corresponding match result serialization queue that particular concurrent write request group that is associated with the particular write request. In some of the noted embodiments, each match result serialization queue for a corresponding write request group is associated with a centralized match result serializer computing node for the corresponding write request group. Accordingly, in some embodiments, during each processing iteration for each centralized match result serializer computing node of G centralized match result serializer computing nodes, the centralized match result serializer computing node retrieves a selected unprocessed match result entry from the match result serialization queue that is associated with the centralized match result serializer computing node, generates a match result validation determination for the selected unprocessed match result entry, and performs one or more subsequent processing operations corresponding to the selected unprocessed match result entry based at least in part on the match result validation determination.

The term "match result validation determination" may refer to a data construct that describes a computed determination about whether the concurrent match result determination for an unprocessed write request entry is valid in light of concurrent write requests that were likely not reflected in the database state data at the time when the concurrent match result determination was generated. Accordingly, in some embodiments, the match result validation determination for an unprocessed write request entry enables performing cross-record matching operations across concurrently-processed write requests to detect potential occurrences of database inconsistency scenarios that may arise when two matching write requests are concurrently processed, such as missed matched scenarios and conflicting match scenarios as described in greater detail herein. In some embodiments, the match result validation determination for an unprocessed write request entry is generated by a centralized match result serializer computing node and based at least in part on the results of performing cross-record matching across the unprocessed match result entry that is associated with the unprocessed write request entry and a recently-processed match result list comprising one or more recently-processed match result entries for one or more recently-processed write requests. In some embodiments, when a centralized match result serializer computing node determines that the concurrent match result determination for an unprocessed write request is valid in light of concurrent write requests that were likely not reflected in the database state data at the time when the concurrent match result determination was generated, the centralized match result serializer computing node assigns an affirmative match result validation determination to the unprocessed write request. In some embodiments, when a centralized match result serializer computing node determines that the concurrent match result determination for an unprocessed write request is not valid in light of concurrent write requests that were likely not reflected in the database state data at the time when the concurrent match result determination was generated, the centralized match result serializer computing node assigns a negative match result validation determination to the unprocessed write request.

The term "recently-processed match result list" may refer to a data construct that describes a set of match result entries that have been assigned an affirmative match result validation determination within a defined recency period before a current processing time. In some embodiments, when the centralized match result serializer computing node determines that the concurrent match result determination for an unprocessed write request is valid in light of concurrent write requests that were likely not reflected in the database state data at the time when the concurrent match result determination was generated, the centralized match result serializer computing node: (i) assigns an affirmative match result validation determination to the unprocessed write request, (ii) generates a recently-processed match result entry for the unprocessed write request in the recently-processed match result list, and (iii) maintains the recently-processed match result entry for the unprocessed write request in the recently-processed match result list for a defined period that is referred to herein as a defined recency period. Accordingly, at a current processing time associated with a current operation of the centralized match result serializer computing node, the recently-processed match result list comprises one or more recently-processed match result entries, where: (i) each recently-processed match result entry corresponds to a recently-processed match result determination, and (ii) each recently-processed match result determination has been assigned an affirmative match result validation determination during a defined recency period before a current processing time.

The term "defined recency period" may refer to a data construct that describes a period of maintenance of a recently-processed match result entry in a recently-processed match result list. In some embodiments, once a recently-processed match result entry is added to the recently-processed match result list upon generating an affirmative match result validation determination for the recently-processed match result entry, the recently-processed match result entry is maintained for a defined period that is referred to herein as a defined recency period. In some embodiments, the defined recency period comprises an estimated database update latency period (e.g., an estimated time for changing database state data in response to a write request after an affirmative match result validation determination is generated for the write request, which may be generated based at least in part on historical data associated with the corresponding database management system).

In some embodiments, the defined recency period further comprises an administrator-defined optimal waiting period that is defined based at least in part on a desired database consistency caution level for the database. For example, when a database administrator indicates a desire to have a high level of caution in terms of maintaining database consistency, the defined recency period may be increased to keep recently-processed match result entries for a longer time in the recently-processed match result entry and thus perform the match result validation determination across a larger set of recently-processed match result entries. Naturally, having a larger set of recently-processed match result entries means that the match result validation determination process will take longer, thus presenting a tradeoff between cautiousness and speed that may be defined based at least in part on configuration data provided by a database administrator.

An example of a defined recency period is a sixteen-second period, which means that, once a recently-processed match result entry is added to the recently-processed match result list upon generating an affirmative match result validation determination for the recently-processed match result entry, the recently-processed match result entry is then maintained for sixteen seconds before the recently-processed match result entry is removed from the recently-processed match result list.

The defined recency period, for example, may be derived from a timeout period for a request processor computing node. For instance, the timeout period for a request processor computing node may be indicative of a threshold time period (e.g., fifteen seconds, etc.) for generating an affirmative match result validation. In the event that an affirmative match result validation is not generated within the time period threshold, the request may be failed. In some examples, the defined recency period may be a time period that is larger than the timeout period to ensure that the centralized match result serializer may perform a validation. For instance, in the event that the timeout period is fifteen seconds, the defined recency period may be sixteen seconds.

The term "serialized match result determination" may refer to a data construct that describes whether a corresponding unprocessed match result entry matches at least one of the one or more recently-processed match result entries described by a recently-processed match result list. In some embodiments, performing cross-record matching operations to generate serialized match result determinations uses the same techniques as those corresponding to cross-record matching operations that are configured to generate concurrent match result determinations, except that the former cross-record matching operations are performed based at least in part on the latest database state data, while the latter cross-record matching operations are performed based at least in part on the one or more recently-processed match result entries. In some embodiments, when the output of cross-relationship matching operations describes that a corresponding unprocessed match result entry matches at least one of the one or more recently-processed match result entries described by a recently-processed match result list, then the serialized match result determination for the corresponding unprocessed match result entry is assigned an affirmative the serialized match result determination. In some embodiments, when the output of cross-relationship matching operations describes that a corresponding unprocessed match result entry fails to match any the one or more recently-processed match result entries described by a recently-processed match result list, then the serialized match result determination for the corresponding unprocessed match result entry is assigned a negative the serialized match result determination.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magneto resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM FRAMEWORK

The system architecture 100 includes a database management system 101 and one or more client computing entities 103. The database management system 101 may be configured to receive database management requests (e.g., database retrieval/read requests, database modification/write requests, database configuration management requests, and/or the like) from the client computing entities 103, perform database management operations (e.g., database retrieval operations, database modification operations, database configuration management operations, and/or the like) in response to the database management requests, and optionally transmit any result data generated by the database management operations to the client computing entities 103. To perform the database management operations, the database management system 101 may maintain and update metadata associated with a database 110, by for example consolidating and/or aggregating the database records of the database 110 via communicating with the client computing entities 103 and using the database update management techniques described herein.

As described in greater detail below, the database management system 101 is configured to perform operations of P concurrent request processor computing nodes and operations of G centralized match result serializer computing nodes. In some embodiments, the noted operation sets may be performed by any number of database management computing entities, such as with a single multi-core database management computing entity or with P. G database management computing entities. For example, in some embodiments, the database management system 101 may comprise P. G database management computing entities, where each database management computing entity is configured to perform operations of either a corresponding concurrent request processor computing node or a corresponding centralized match result serializer computing node. As another example, in some embodiments, the database management system 101 may comprise a single database management computing entity that comprises P. G processors, where each processor is configured to perform operations of either a corresponding concurrent request processor computing node or a corresponding centralized match result serializer computing node. As yet another example, in some embodiments, the database management system 101 may comprise two database management computing entities, where a first database management computing entity comprises P processors that are collectively configured to perform operations of the P concurrent request processor computing nodes, and a second database management computing entity comprises (processors that are collectively configured to perform operations of the G centralized match result serializer computing nodes.

Accordingly, while various embodiments of the present invention describe a database management system 101 that has a single database management computing entity (e.g., the database management computing entity 106 of FIG. 1), a person of ordinary skill in the relevant technology will recognize that the database management system 101 may comprise any number of database management computing entities 106 (e.g., up to P+G database management computing entities). In some embodiments, regardless of how many computing entities are used to perform operations of the P concurrent request processor computing nodes, the noted operation sets are performed in parallel. In some embodiments, regardless of how many computing entities are used to perform operations of the G centralized match result serializer computing nodes, the noted operation sets are performed in parallel.

The database management system 101 may comprise a database management computing entity 106 and a storage subsystem 108. The database management computing entity 106 may be configured to receive database management requests (e.g., database retrieval requests, database modification requests, database configuration management requests, and/or the like) from the client computing entities 103, perform database management operations (e.g., database retrieval operations, database modification operations, database configuration management operations, and/or the like) in response to the database management requests, and optionally transmit any result data generated by the database management operations to the client computing entities 103. To perform the database management operations, the database management computing entity 106 may maintain and update metadata associated with a database 110, by for example consolidating and/or aggregating the database records of the database 110 via communicating with the client computing entities 103 and using the database update management techniques described herein.

The storage subsystem 108 may store a database 110 and database configuration data 112 used by the database management computing entity 106 to perform various database management operations with respect to the database 110. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. Examples of database configuration data 112 include database state data describing one or more database aggregates of the database 110.

A. Exemplary Database Management Computing Entity

FIG. 2 provides a schematic of a database management computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the database management computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the database management computing entity 106 may include or be in communication with a processing element 205 (also referred to as processors, processing circuitry, and/or similar terms used herein interchangeably) that communicate with other elements within the database management computing entity 106 via a bus, for example. As will be understood, the processing element 205 may be embodied in a number of different ways. For example, in some embodiments, the processing element 205 may be part of one or more processing elements, such as one or more processing elements that may perform operations in a parallel manner.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the database management computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the database management computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store, at least, portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the database management computing entity 106 with the assistance of the processing element 205 and operating system.

As indicated, in one embodiment, the database management computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the database management computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the database management computing entity 106 may include or be in communication with one or more input elements, such as a keyboard input, a mouse input, a touch screen/display input, motion input, movement input, audio input, pointing device input, joystick input, keypad input, and/or the like. The database management computing entity 106 may also include or be in communication with one or more output elements (not shown), such as audio output, video output, screen/display output, motion output, movement output, and/or the like.

B. Exemplary Client Computing Entity

FIG. 3 provides an illustrative schematic representative of a client computing entity 103 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Client computing entities 103 can be operated by various parties. As shown in FIG. 3, the client computing entity 103 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 103 may be capable of operating with one or more air interface standards, communication protocols, modulation types, and access types. More particularly, the client computing entity 103 may operate in accordance with any of a number of wireless communication standards and protocols, such as those described above with regard to the database management computing entity 106. In a particular embodiment, the client computing entity 103 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 103 may operate in accordance with multiple wired communication standards and protocols, such as those described above with regard to the database management computing entity 106 via a network interface 320.

Via these communication standards and protocols, the client computing entity 103 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 103 can also download changes, add-ons, and updates, for instance, to its firmware, software (e.g., including executable instructions, applications, program modules), and operating system.

According to one embodiment, the client computing entity 103 may include location determining aspects, devices, modules, functionalities, and/or similar words used herein interchangeably. For example, the client computing entity 103 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal-Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 103 position in connection with a variety of other systems, including cellular towers, Wi-Fi access points, and/or the like. Similarly, the client computing entity 103 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 103 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 103 to interact with and/or cause display of information/data from the database management computing entity 106, as described herein. The user input interface can comprise any of a number of devices or interfaces allowing the client computing entity 103 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 103 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 103 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 103. As indicated, this may include a user application that is resident on the entity or accessible through a browser or other user interface for communicating with the database management computing entity 106 and/or various other computing entities.

In another embodiment, the client computing entity 103 may include one or more components or functionality that are the same or similar to those of the database management computing entity 106, as described in greater detail above. As will be recognized, these frameworks and descriptions are provided for exemplary purposes only and are not limiting to the various embodiments.

In various embodiments, the client computing entity 103 may be embodied as an artificial intelligence (AI) computing entity, such as an Amazon Echo, Amazon Echo Dot, Amazon Show, Google Home, and/or the like. Accordingly, the client computing entity 103 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, to address the above-noted challenges associated with efficiency and scalability of performing parallel/concurrent write request processing/matching while maintaining database state consistency, various embodiments of the present invention enable using P concurrent request processor computing nodes to generate concurrent match result determinations for concurrent write requests in a concurrent write request groups, where the concurrent match result determinations are then serialized using a match result serialization queue and processed using a centralized match result serializer computing node to generate match result validation determinations for the concurrent match result determinations. As described herein, while parallel/concurrent write request processing/matching has advantages when it comes to increasing write request processing speed (which is especially significant for real-time and/or near-real-time database update applications), it poses challenges related to maintaining database state consistency. One solution to this challenge is to use database management systems that enable transaction management to ensure transactional serialization. Examples of such database management systems include various relational database management systems (e.g., Oracle, PostgreSQL, and/or the like) that use conventional relational database locking by preventing conflicting decisions via locking record rows and preventing missed matches by locking index locations. However, such solutions introduce deadlock problems. Moreover, database management systems that enable transaction management to ensure transactional serialization are typically limited in terms of performance efficiency and scalability, which often makes the database a key bottleneck for complex software applications. Because of this, many database management systems, such as various document-based database management systems, such as DynamoDB and MongoDB, may limit serialization-based transaction management (e.g., by limiting the number of items that may be updated, their total size, etc.). This means that, many database management systems that offer many performance efficiency and scalability advantages suffer from substantial challenges related to maintaining database state consistency when it comes to parallel/concurrent write request processing/matching.

FIG. 4 is a dataflow diagram of an example process 400 for performing database update operations corresponding to a concurrent write request group. Via the various steps/operations of the process 400, a database management system 101 can perform database update operations by performing database matching operations in real-time and/or in near-real-time using concurrently-executed request processor threads while reducing, minimizing, and/or eliminating the likelihood of database inconsistency resulting from missing database matches and/or conflicting database matches.

The process 400 comprises: (i) a match result determination routine 401 that is configured to generate a concurrent match result determination for each concurrent write request in the concurrent write request group, and (ii) a match result serialization routine 402 that is configured to perform database update operations using a serialization ordering of the concurrent match result determinations.

As described herein, the match result determination routine 401 uses P concurrent request processor computing nodes to generate the concurrent match result determinations while the match result serialization routine 402 uses a match result serialization queue and a recently-processed match result list to perform database operations using the concurrent match result determinations. However, a person of ordinary skill in the relevant technology will recognize that the two routines may be performed separately from each other. For example, the concurrent match result determinations generated by a match result determination routine 401 may be validated/processed in accordance with techniques that impose a serialization ordering on the concurrent match result determinations using techniques other than the techniques described herein with respect to the match result serialization routine 402. As yet another example, performing database update operations using a serialization ordering of the concurrent match result determinations may be performed using techniques that do not use at least one of a match result serialization queue and a recently-processed match result list.

Moreover, while the process 400 comprises performing database update operations corresponding to one concurrent write request group, a person of ordinary skill in the relevant technology will recognize that a database may receive concurrent write requests that belong to two or more groups/populations. In some embodiments, given (concurrent write request groups, the concurrent write requests in the (concurrent write request groups are concurrently collectively processed as one write request unit by the P concurrent request processor computing entities. However, after a concurrent request processor computing entity generates a concurrent match result determination for a particular concurrent write request that is associated with a particular concurrent write request group, the corresponding unprocessed match result entry for the particular concurrent write request is generated in a particular match result serialization queue that is associated with the particular concurrent write request group, and then the match result serialization queue is used by a particular centralized match result serialization computing node that is associated with the particular concurrent write request group to perform database update operations.

As depicted in FIG. 4, the match result determination routine 401 comprises receiving a concurrent write request group 411. A concurrent write request group may describe a group of database write requests that are concurrently processed, such that one concurrently-processed write request (referred to herein as a concurrent write request) is processed before the database state is modified in accordance with another concurrently-processed write request. Examples of write requests include a request to add a new database record to a database or a request to modify an existing database record of a database. In some embodiments, because one concurrent write request is processed before another, the database state is modified in accordance with the other concurrent write request. If the two write requests satisfy a cross-record matching relationship (e.g., correspond to the same real-world identity) such that they should be both assigned to the same database aggregate, and if the underlying database does not perform transaction management via locking record rows (as is the case with many document-based databases such as MongoDB), then performing cross-record matching operations across the two database records based at least in part on the latest database state using concurrent/parallel database matching may be challenging, as the matching determination for one concurrent write request may be performed based at least in part on database states do not reflect the other concurrent write request. Examples of database inconsistency scenarios that may arise when two matching write requests are concurrently processed include a "missed match" scenario and a "conflicting match" scenario, as further described below.

The missed match scenario may arise when two or more concurrent write requests correspond to two or more database records that do not match with any existing database aggregate. For example, as depicted in FIG. 5, two concurrent write requests include a first concurrent write request that requests adding the database record 501 and a second concurrent write that requests adding the database record 502, where the two database records satisfy a cross-record matching relationship. Here, if the two database records were not concurrently processed, then a cross-record matching engine (e.g., a cross-record matching engine comprising P cross-record matching threads that are executed in parallel) would have likely detected a match across the earlier-processed database record and the later-processed database record because, at the time of processing the later-processed database record, the database state would have already been updated in accordance with the earlier-processed database. For example, if the database record 501 was fully processed first before the processing of the database record 502 began, then, at the time of processing the database record 502, the cross-record matching engine would have likely retrieved database state data corresponding to the database record 502 and detected the cross-record matching relationship between the two database record based at least in part on the retrieved database state data. However, since the two database records are concurrently processed, the cross-record matching engine will likely fail to detect the cross-record matching relationship between the two database records, resulting in assigning the database record 501 to a first database aggregate 511 and the database record 502 to a second database aggregate 512. Because the two database records satisfy a cross-record matching relationship but are assigned to different database aggregates, the underlying database state data has an inconsistent state.

The conflicting match scenario may arise when two or more concurrent write requests correspond to two or more database records that all match with the same database record. For example, as depicted in FIG. 6, two concurrent write requests include a first concurrent write request that requests adding the database record 601 and a second concurrent write that requests adding the database record 602, where the two database records satisfy a cross-record matching relationship with each other and with a "Jane Smith" database record. Here, if the two database records were not concurrently processed, then a cross-record matching engine (e.g., a cross-record matching engine comprising P cross-record matching threads that are executed in parallel) would likely have detected: (i) during the processing of the earlier-processed database record, that the earlier-processed database record and the "Jane Smith" database record have a cross-record matching relationship and thus should be assigned to a particular database aggregate, and (ii) during the processing of the later-processed database record, that the later-processed database record and the particular database aggregate comprising the earlier-processed database record and the "Jane Smith" database record have a cross-record matching relationship, and thus the later-processed database record should be assigned to the particular database aggregate. For example, if the database record 601 was fully processed first before the processing of the database record 602 began, then: (i) during the processing of the database record 601, the cross-record matching engine would have assigned the database record 601 to a database aggregate that also comprises "Jane Smith" database record, and (ii) during the processing of the database record 602, the cross-record matching engine would have assigned the database record 602 to the described database aggregate. However, since the two database records are concurrently processed, the cross-record matching engine will likely fail to detect the cross-record matching relationship between the two database records, resulting in assigning the "Jane Smith" database record to two database aggregates: a first database aggregate 611 that is associated with the database record 601 and the "Jane Smith" database record, and a second database aggregate 612 that is associated with the database record 602 and the "Jane Smith" database record. Because the "Jane Smith" database record has been assigned to two distinct database aggregates, the underlying database state data has an inconsistent state.

As the above-described examples illustrate, while parallel/concurrent write request processing/matching has advantages when it comes to increasing write request processing speed (which is especially significant for real-time and/or near-real-time database update applications), it poses challenges related to maintaining database state consistency.

One solution to this challenge is to use database management systems that enable transaction management to ensure transactional serialization. Examples of such database management systems include various relational database management systems (e.g., Oracle, PostgreSQL, and/or the like) that use conventional relational database locking by preventing conflicting decisions via locking record rows and preventing missed matches by locking index locations. However, such solutions introduce deadlock problems. Moreover, database management systems that enable transaction management to ensure transactional serialization are typically limited in terms of performance efficiency and scalability, which often makes the database a key bottleneck for complex software applications. Because of this, many database management systems, such as various document-based database management systems, such as MongoDB, do not enable serialization-based transaction management. This means that, many database management systems that offer many performance efficiency and scalability advantages suffer from substantial challenges related to maintaining database state consistency when it comes to parallel/concurrent write request processing/matching.

As depicted in FIG. 4, to address the challenges associated with maintaining database state consistency when it comes to parallel/concurrent write request processing/matching, the match result determination routine 401 processes the concurrent write request group 411 using P concurrent request processor computing nodes 412. The P concurrent request processor computing nodes 412 are configured to execute P cross-record matching threads in parallel, where each cross-record matching thread is configured, during each processing cycle, to access the database state data 421 associated with a database to generate a concurrent match result determination for a particular write request.

In some embodiments, the P concurrent request processor computing nodes 412 comprise P separate computing entities/devices of the database management system 101, where each separate computing entity is configured to perform operations corresponding to a cross-record matching thread, and the P separate computing entities are configured to execute in parallel. In some embodiments, the P concurrent request processor computing nodes 412 comprise P separate processors of a multi-processor computing entity of the database management system 101, where each separate processor is configured to perform operations corresponding to a cross-record matching thread, and the P processors are configured to execute in parallel. In some embodiments, the P concurrent request processor computing nodes comprise a set of computing entities and a set of processors in a multi-processor environment.

Accordingly, a concurrent request processor computing node may be a computing entity/device or a computer processor of a multi-processor computing entity/device that is configured to generate a concurrent match result determination for a particular write request. In some embodiments, a concurrent request processor computing node retrieves a write request from a set of concurrent write requests (e.g., a set of concurrent write requests associated with one or more concurrent write request groups), retrieves latest database state data associated with a database, and then generates the concurrent match result determination for the particular write request based at least in part on the data (e.g., content data, header metadata, and/or the like) associated with the particular write request and the latest database state data (e.g., data about latest database records of the database, latest database aggregates of the database, and/or the like). In some embodiments, to generate the concurrent match result determination for a particular write request, the concurrent request processor computing node uses one or more conventional cross-record matching functionalities, such as one or more conventional cross-record matching functionalities enable by a cross-record matching software library (e.g., the Scalable Complex Entity Partitioner (SCEPter) software library). In some examples, the data associated with the particular write request may include a list of observations for items that were searched in the database.

The concurrent match result determination for a write request may describe a computed determination about whether the write request corresponds to one or more database records and/or one or more database aggregates described by the database state data of a corresponding database, where the computed determination is determined using a particular request processor computing node of P concurrent request processor computing nodes. In some embodiments, the concurrent match result determination for a write request describes a proposed database aggregate for the write request. In some of the noted embodiments, if a request processor computing node determines that the write request is not matched with any of the existing database records and/or with any of the existing database records of the database, then the concurrent match result determination for the write request may describe that the write request is associated with a proposed database aggregate that is a new database aggregate (i.e., a database aggregate that is not currently described by the database state data associated with the database). In some of the noted embodiments, if a request processor computing node determines that the write request is matched with an existing database record and/or with an existing database aggregate of the database, then the concurrent match result determination for the write request may describe that the write request is associated with a proposed database aggregate that corresponds to the existing database record and/or the existing database aggregate.

In some embodiments, in addition to the proposed database aggregate for a write request, the concurrent match result determination for the write request describes the content data associated with the write request (e.g., content data associated with a new database record that the write request seeks to add, content data associated with modified database record fields that the write request seeks to integrate into a target database record, content data associated with an existing database record that the write request seeks to modify/change, and/or the like), metadata associated with the database records that the write request affects, data associated with the proposed database aggregate, data associated with the database records that are associated with the proposed database aggregate, and/or the like. In some embodiments, the concurrent match result determination for the write request describes one or more proposed database update operations that, if executed, modify database state data to reflect changes the proposed database aggregate, where the changes correspond to the write request content data.

In some embodiments, during each processing iteration for a concurrent request processor computing node, the concurrent request processor computing node retrieves a write request from a centralized queue of unprocessed write requests (e.g., a queue that reflects the order in which the write requests are received). Moreover, in some embodiments, during each processing iteration for a concurrent request processor computing node, the concurrent request processor computing node accesses the database state data for an underlying database, where the database state data is stored in a non-local storage medium (e.g., database state data stored on a remote/non-local permeant storage medium). This means that the operations of concurrent request processor computing nodes likely incur a data retrieval latency that is associated with retrieving database state data from a non-local storage medium. However, the effect of this data retrieval latency on the overall write request processing pipeline is minimized because the concurrent request processor computing nodes execute cross-record matching threads in a parallelized/concurrent manner.

Accordingly, in some embodiments, in accordance with the match result determination routine 401, the P concurrent request processor computing nodes 412 generate concurrent match result determinations 413 for write requests that are selected from the concurrent write request group 411. In some embodiments, for each concurrent write request in the concurrent write request group (e.g., each concurrent write request in the concurrent write request group that is selected from an unprocessed write request queue in accordance with the ordering defined by the unprocessed write queue): (i) a selected request processor computing node of the P concurrent request processor computing nodes 412 is assigned to the concurrent write request (e.g., the concurrent request processor computing node that retrieves a concurrent write request from the unprocessed write request queue is assigned as the selected request processor computing node for the concurrent write request), and (ii) a concurrent match result determination is generated for the concurrent write request node using the selected request processor computing node for the concurrent write request).

Furthermore, as further depicted in FIG. 4, the match result determination routine 401 continues when, once a particular concurrent match result determination for a particular write request is generated by a concurrent request processor computing node, an unprocessed match result entry for the particular concurrent match result determination is added to a match result serialization queue 414. As described above, in some embodiments, given (concurrent write requests groups, each concurrent write request group is associated with a corresponding match result serialization queue. In some of the noted embodiments, once a particular concurrent match result determination for a particular write request is generated by a concurrent request processor computing node, an unprocessed match result entry for the particular concurrent match result determination is added to the corresponding match result serialization queue that particular concurrent write request group that is associated with the particular write request.

In some embodiments, to generate a match result determination for a repartitioning request that seeks to repartition a set of database aggregates, a concurrent request processor computing node determines whether the set of data records associated with the database aggregates after the repartitioning includes the set of data records associated with the database aggregates prior to data partitioning. If the concurrent request processor computing node determines whether the set of data records associated with the database aggregates after the repartitioning fails to include the set of data records associated with the database aggregates prior to data partitioning, then the concurrent request processor computing node does not generate the match result determination for the repartitioning request and instead reject the repartitioning request so it is added to the input queue for the P concurrent request processor computing nodes.

In some embodiments, as part of generating a match result determination that is associated with a set of database aggregates, a concurrent request processor computing node adds a data field to the match result determination that describes the latest update date for the set of database aggregates. In some of the noted embodiments, the match result serializer can then use the latest update date to reject those match result determinations whose latest update date is different from the latest update date that is available to the match result serializer.

A match result serialization queue may describe a serialization ordering of a set of unprocessed match result entries. In some embodiments, when a concurrent match result determination is generated for a write request, data associated with the concurrent match result determination is added to a match result serialization queue using an unprocessed match result entry for the write request. In some of the noted embodiments, once the unprocessed match result entry for a write request is added to the match result serialization queue, the unprocessed match result entry is maintained in the match result serialization queue until the write request is fully "processed," which includes generates a match result validation determination for the concurrent match result determination that is associated with the write request. Accordingly, the match result serialization queue may be associated with a set of unprocessed match result entries, where each of unprocessed match result entry is associated with an unprocessed write request whose unprocessed concurrent match result determination has already been generated by a concurrent request processor computing node and describes data associated with the noted unprocessed concurrent match result determination.

Accordingly, in some embodiments: (i) the match result serialization queue describes a serialization ordering of one or more unprocessed match result entries, (ii) each unprocessed match result entry corresponds to an unprocessed concurrent match result determination that has not been processed, and (iii) processing a particular unprocessed concurrent match result determination comprises generating a match result validation determination for the particular unprocessed concurrent match result determination.

In some embodiments, being a queue, the match result serialization queue is associated with an ordering of its queue entries, which in this case are the match result entries. The ordering associated with the match result serialization queue is herein referred to as a serialization order, because the ordering effectively serializes concurrent match result determinations that are generated in a non-serial fashion. In other words, instead of imposing serial processing accordance the totality of a matching/aggregation-aware database update pipeline, various embodiments of the present invention impose serialization on a portion of the noted pipeline, thus reducing the negative efficiency, speed, and scalability downsides of serialized transactional management on the overall database management experience.

In some embodiments, given a match result serialization queue that is associated with a set of unprocessed match result entries, the serialization order for the match result serialization queue is generated based at least in part on priority scores for unprocessed match result entries, where the priority score for a particular unprocessed match result entry is generated based at least in part on at least one of: (i) a temporal priority score for the particular unprocessed match result entry that is determined based at least in part on a generation time of the unprocessed match result entry, (ii) a size-based priority score for the particular unprocessed match result entry that is determined based at least in part on a count of database records associated with the proposed database aggregate for the corresponding unprocessed match result determination, and (iii) a group-based priority score for the particular unprocessed match result entry that is determined based at least in part on a priority score for the concurrent write request group that is associated with the corresponding write request for the particular unprocessed match result entry. For example, in some embodiments, the unprocessed match result entries for some current write request groups/populations are prioritized in the serialization order. As another example, in some embodiments, the unprocessed match result entries for "larger" database aggregates (as determined based at least in part on number of database records for database aggregates) are prioritized in the serialization order.

As depicted in FIG. 4, in some embodiments, operations of the match result determination routine 401 that are performed with respect to a particular write request end when the unprocessed write request entry for the particular write request is added to the match result serialization queue 414. Afterward, the particular write request is processed by the match result serialization routine 402. As part of the match result serialization routine 402, a centralized match result serializer computing node 415 retrieves unprocessed match result entries from the match result serialization queue 414 in accordance with the serialization ordering of the match result serialization queue 414, and then for each retrieved/selected unprocessed match result entry generates a match result validation determination, which can then be used to either add a new concurrent write request for the retrieved/selected unprocessed match result entry to the concurrent write request group, or to perform database update operations corresponding to the write request that is associated with the retrieved/selected unprocessed match result entry and the unprocessed concurrent match determination that is associated with the retrieved/selected unprocessed match result entry.

In some embodiments, a centralized match result serializer computing node is a computing entity/device and/or a computer processor that is configured to, during each processing iteration: (i) select/retrieve a selected unprocessed match result entry from the one or more unprocessed match result entries described by the match result serialization queue in accordance with the serialization ordering, (ii) generate a match result validation determination for the selected unprocessed match result entry, and (iii) perform one or more subsequent processing operations corresponding to the selected unprocessed match result entry based at least in part on the match result validation determination. As described above, in some embodiments, given (concurrent write requests groups, each concurrent write request group is associated with a corresponding match result serialization queue, and once a particular concurrent match result determination for a particular write request is generated by a concurrent request processor computing node, an unprocessed match result entry for the particular concurrent match result determination is added to the corresponding match result serialization queue that particular concurrent write request group that is associated with the particular write request. In some of the noted embodiments, each match result serialization queue for a corresponding write request group is associated with a centralized match result serializer computing node for the corresponding write request group. Accordingly, in some embodiments, during each processing iteration for each centralized match result serializer computing nodes of (centralized match result serializer computing nodes, the centralized match result serializer computing node retrieves a selected unprocessed match result entry from the match result serialization queue that is associated with the centralized match result serializer computing node, generates a match result validation determination for the selected unprocessed match result entry, and performs one or more subsequent processing operations corresponding to the selected unprocessed match result entry based at least in part on the match result validation determination.

In some embodiments, the centralized match result serializer computing node rejects a concurrent match result determination based on recent history data for the concurrent match result determination. For instance, the centralized match result serializer computing node may reject a concurrent write request determination whose recent history data is insufficient. This may occur, for example, if there is lag between the request processor computing node and the centralized match result serializer computing node. For instance, in the presence of lag, the match result serialization queue may build up which may cause a recency period to be insufficient. This may lead to the expiration of recent history data for a concurrent write request determination. For instance, recent history data may have a recent history expiration date that occurs before the start date of a past period that includes X time units from a current time, where X equals a threshold minimum recent history hold time plus a maximum time that a request processor computing node has to process a concurrent write request before the request processor computing node is programmed to reject the concurrent write request (e.g., a timeout period, etc.). In other words, the centralized match result serializer computing node only holds a concurrent write request whose recent history was indicated to be valid at least as late as a threshold minimum recent history hold time plus a maximum time that a request processor computing node has to process a concurrent write request before it is programmed to reject the concurrent write request. To avoid inappropriately validating a concurrent match result determination when there is insufficient history available in the recent history data inside the centralized match result serializer computing node, the centralized match result serializer computing node may detect an insufficient history condition and reject the concurrent match result determination, sending it back due to insufficient history.

In some embodiments, a match result validation determination for an unprocessed write request entry describes a computed determination about whether the concurrent match result determination for the unprocessed write request entry is valid in light of concurrent write requests that were likely not reflected in the database state data at the time when the concurrent match result determination was generated. Accordingly, in some embodiments, the match result validation determination for an unprocessed write request entry enables performing cross-record matching operations across concurrently-processed write requests to detect potential occurrences of database inconsistency scenarios that may arise when two matching write requests are concurrently processed, such as missed matched scenarios and conflicting match scenarios as described in greater detail above. In some embodiments, the match result validation determination for an unprocessed write request entry is generated by a centralized match result serializer computing node and based at least in part on the results of performing cross-record matching across the unprocessed match result entry that is associated with the unprocessed write request entry and a recently-processed match result list comprising one or more recently-processed match result entries for one or more recently-processed write requests.

In some embodiments, when a centralized match result serializer computing node determines that the concurrent match result determination for an unprocessed write request is valid in light of concurrent write requests that were likely not reflected in the database state data at the time when the concurrent match result determination was generated, the centralized match result serializer computing node assigns an affirmative match result validation determination to the unprocessed write request. In some embodiments, when a centralized match result serializer computing node determines that the concurrent match result determination for an unprocessed write request is not valid in light of concurrent write requests that were likely not reflected in the database state data at the time when the concurrent match result determination was generated, the centralized match result serializer computing node assigns a negative match result validation determination to the unprocessed write request.

In some embodiments, the centralized match result serializer computing node 415 performs the steps/operations that of the process that is depicted in FIG. 7. As depicted in FIG. 7, the process begins at step/operation 701 when the centralized match result serializer computing node 415 retrieves a selected unprocessed match result entry from the one or more unprocessed match result entries described by the match result serialization queue in accordance with the serialization ordering. In other words, the centralized match result serializer computing node 415 retrieves the unprocessed match result entry that is at the top of the match result serialization queue.

At step/operation 702, the centralized match result serializer computing node 415 retrieves a recently-processed match result list comprising one or more recently-processed match result entries. In some embodiments, the recently-processed match result list describes a set of match result entries that have been assigned an affirmative match result validation determination within a defined recency period before a current processing time. In some embodiments, when the centralized match result serializer computing node determines that the concurrent match result determination for an unprocessed write request is valid in light of concurrent write requests that were likely not reflected in the database state data at the time when the concurrent match result determination was generated, the centralized match result serializer computing node: (i) assigns an affirmative match result validation determination to the unprocessed write request, (ii) generates a recently-processed match result entry for the unprocessed write request in the recently-processed match result list, and (iii) maintains the recently-processed match result entry for the unprocessed write request in the recently-processed match result list for a defined period that is referred to herein as a defined recency period. Accordingly, at a current processing time associated with a current operation of the centralized match result serializer computing node, the recently-processed match result list comprises one or more recently-processed match result entries, where: (i) each recently-processed match result entry corresponds to a recently-processed match result determination, and (ii) each recently-processed match result determination has been assigned an affirmative match result validation determination during a defined recency period before a current processing time.

In some embodiments, the recently-processed match result list comprises, in addition to the recently-processed match results, recently-deleted database records. In some of the noted embodiments, tracking recently deleted database records enables generating an affirmative serialized match result determination for a particular unprocessed match result entry in the match result serialization queue that describes a particular proposed database aggregate if the recently-deleted database records described by the recently-processed match result list include a recently-deleted database record that is in the particular proposed database aggregate. For example, if a selected unprocessed match result entry proposes a database aggregate that includes database records R1 and R2, and further if the recently-processed match result list describes that R1 has been recently deleted, then the selected unprocessed match result entry may be assigned an affirmative serialized match result determination and a negative match result validation determination.

In some embodiments, the recently-processed match result list is stored in a local storage medium (e.g., a local cache storage medium) of the centralized match result serializer computing node. In some embodiments, the centralized match result serializer computing node does not directly access the database state data, but accesses the recently-processed match result list. Because operations of the centralized match result serializer computing node 415 is in some embodiments a non-parallelizable component of the overall write request processing pipeline, it is important to minimize the data retrieval latency associated with the noted operations of the centralized match result serializer computing node 415, and thus using local storage mediums and using high-speed cache storage mediums is beneficial. In some embodiments, the recently-processed match result list is stored in a temporal cache, such as a temporal first-in-first-out (FIFO) cache. However, as described above, in some embodiments, (centralized match result serializer computing nodes are utilized, and in some of the noted embodiments the operations of the noted G centralized match result serializer computing nodes may be performed in parallel. Accordingly, in some embodiments, there are substantial speed advantages to dividing concurrent write request into multiple concurrent write request groups, a task that may be performed using write request segmentation heuristics (e.g., assigning write requests associated with different territories to different concurrent write request groups).

As described above, in some embodiments, once a recently-processed match result entry is added to the recently-processed match result list upon generating an affirmative match result validation determination for the recently-processed match result entry, the recently-processed match result entry is maintained for a defined period that is referred to herein as a defined recency period. In some embodiments, the defined recency period comprises an estimated database update latency period (e.g., an estimated time for changing database state data in response to a write request after an affirmative match result validation determination is generated for the write request, which may be generated based at least in part on historical data associated with the corresponding database management system). In some embodiments, the defined recency period further comprises an administrator-defined optimal waiting period that is defined based at least in part on a desired database consistency caution level for the database. For example, when a database administrator indicates a desire to have a high level of caution in terms of maintaining database consistency, the defined recency period may be increased to keep recently-processed match result entries for a longer time in the recently-processed match result entry and thus perform the match result validation determination across a larger set of recently-processed match result entries. Naturally, having a larger set of recently-processed match result entries means that the match result validation determination process will take longer, thus presenting a tradeoff between cautiousness and speed that may be defined based at least in part on configuration data provided by a database administrator. An example of a defined recency period is a 2 second period, which means that, once a recently-processed match result entry is added to the recently-processed match result list upon generating an affirmative match result validation determination for the recently-processed match result entry, the recently-processed match result entry is then maintained for sixteen seconds before the recently-processed match result entry is removed from the recently-processed match result list.

At step/operation 703, the centralized match result serializer computing node 415 generates a serialized match result determination for the selected unprocessed match result entry based at least in part on whether the selected unprocessed match result entry matches at least one of the one or more recently-processed match result entries. In some embodiments, a serialized match result determination describes whether a corresponding unprocessed match result entry matches at least one of the one or more recently-processed match result entries described by a recently-processed match result list. In some embodiments, performing cross-record matching operations to generate serialized match result determinations uses the same techniques as those corresponding to cross-record matching operations that are configured to generate concurrent match result determinations, except that the former cross-record matching operations are performed based at least in part on the latest database state data, while the latter cross-record matching operations are performed based at least in part on the one or more recently-processed match result entries.

In some embodiments, when the output of cross-relationship matching operations describes that a corresponding unprocessed match result entry matches at least one of the one or more recently-processed match result entries described by a recently-processed match result list, then the serialized match result determination for the corresponding unprocessed match result entry is assigned an affirmative the serialized match result determination. In some embodiments, when the output of cross-relationship matching operations describes that a corresponding unprocessed match result entry fails to match any the one or more recently-processed match result entries described by a recently-processed match result list, then the serialized match result determination for the corresponding unprocessed match result entry is assigned a negative the serialized match result determination.

In some embodiments, given a selected unprocessed match result entry for an unprocessed match result determination that describes a particular proposed database aggregate, if the recently-processed match result entries described by the recently-processed match result list include a recently-processed match result entry that is associated with a database record in the particular proposed database aggregate, then an affirmative serialized match result determination is assigned to the selected unprocessed match result entry, which (as described below) may lead to also assigning a negative match result validation determination to the selected unprocessed match result entry. For example, if the selected unprocessed match result entry proposes a database aggregate that includes database records R1 and R2, and further if a recently-processed match result entry in the recently-processed match result list is already validated to reflect a database aggregate that includes database records R1 and R3, then because R1 is subject to the recently-processed match result list, the selected unprocessed match result entry may be assigned an affirmative serialized match result determination and a negative match result validation determination. In some embodiments, this approach eliminates/reduces the likelihood of the conflicting match scenario described above.

In some embodiments, given a selected unprocessed match result entry for an unprocessed match result determination that is associated with a particular database record, if the database record matches at least one of the database records corresponding to the one or more recently-processed match result entries described by the recently-processed match result list, then an affirmative serialized match result determination is assigned to the selected unprocessed match result entry, which (as described below) may lead to also assigning a negative match result validation determination to the selected unprocessed match result entry. For example, if the selected unprocessed match result entry proposes adding a new database aggregate that includes database record R1, further if a recently-processed match result entry in the recently-processed match result list is already validated to add a new database aggregate that includes database record R2, and if the output of a cross-record matching operations describes that R1 and R2 have a cross-record matching relationship, the selected unprocessed match result entry may be assigned an affirmative serialized match result determination and a negative match result validation determination. In some embodiments, this approach eliminates/reduces the likelihood of the missed match scenario described above.

In some embodiments, the missed match scenario is processed by a different processing node than the conflicting match scenario. In such a case, a negative match result validation determination is not assigned to the selected unprocessed match result entry in the event that the output of a cross-record matching operations describes that R1 and R2 have a cross-record matching relationship, such that the selected unprocessed match result entry may still be stored and published downstream, despite the missed match scenario. This, in turn, allows a database to contain multiple identities for the same entity briefly, but does not cause the database to be internally inconsistent. The cross-record matching operations may then be performed by a separate computing node by detecting missed matches, using a separate recently-processed match result list, in the manner described herein. When a missed match is detected, the separate computing node may provide a rectifying request to a concurrent request processor computing node after the original selected unprocessed match result entry has been stored and/or published. The rectifying request may cause a new concurrent match result determination (e.g., where the identities have been merged) for the selected unprocessed match result entry to be validated, stored, and/or published.

At step/operation 704, the centralized match result serializer computing node 415 generates the match result validation determination for the selected unprocessed match result entry based at least in part on the serialized match result determination for the selected unprocessed match result entry. In some embodiments, if the serialized match result determination for the selected unprocessed match result entry is a negative serialized match result determination, then the selected unprocessed match result entry is assigned an affirmative match result validation determination. In some embodiments, if the serialized match result determination for the selected unprocessed match result entry is an affirmative serialized match result determination, then the selected unprocessed match result entry is assigned a negative match result validation determination.

Returning to FIG. 4, the match result serialization routine 402 continues when the centralized match result serializer computing node 415 performs subsequent processing operations with respect to a selected unprocessed match result entry that is selected from the one or more unprocessed match result entries described by the match result serialization queue in accordance with the serialization ordering, where the subsequent processing operations are performed based at least in part on the generated match result validation determination for the selected unprocessed match result entry.

For example, as depicted in FIG. 4, if the match result validation determination for the selected unprocessed match result entry is a negative match result validation determination, then the match result serialization routine 402 adds a new concurrent write request 416 for the selected unprocessed match result entry to the concurrent write request group 411, and removes the selected unprocessed match result entry from the one or more unprocessed match result entries as described by the match result serialization queue 414. In some embodiments, because the negative match result validation determination describes that the concurrent match result determination for the selected unprocessed match result entry is invalid in light of concurrent write requests, then the concurrent match result determination for the selected unprocessed match result entry is discarded and the selected unprocessed match result entry is added to the concurrent write request so that a new concurrent match result determination for the selected unprocessed match result entry can be generated using the P concurrent request processor computing nodes 412 and based at least in part on latest database state data that now includes changes by previously-concurrent write requests that matched with the selected unprocessed match result entry and caused generation of the negative match result validation determination.

As another example, as further depicted in FIG. 4, if the match result validation determination for the selected unprocessed match result entry is an affirmative match result validation determination, then the match result serialization routine 402 generates a database update request 417 to modify database state data 421 based at least in part on the data associated with the selected unprocessed match result entry (e.g., based at least in part on the corresponding concurrent write request and/or based at least in part on the corresponding concurrent match result determination), adds a new recently-processed match result entry for the selected unprocessed match result entry to the one or more recently-processed match result entries described by the recently-processed match result list, and removes the selected unprocessed match result entry from the one or more unprocessed match result entries described by the match result serialization queue. In some embodiments, because the affirmative match result validation determination describes that the concurrent match result determination for the selected unprocessed match result entry is valid in light of concurrent write requests, the selected unprocessed match result entry is used to update latest database data, and a recently-processed match result entry for the selected unprocessed match result entry is also added to the recently-processed match result list so that subsequent unprocessed match result entries can be checked against the recently-processed match result entry while the recently-processed match result entry is in the recently-processed match result list (i.e., during the recency period before after the recently-processed match result entry for the selected unprocessed match result entry is also added to the recently-processed match result list).

As yet another example, as further depicted in FIG. 4, if the match result validation determination for the selected unprocessed match result entry is an affirmative match result validation determination, then the match result serialization routine 402 transmits match result stream data 418 corresponds to the noted match result entry to one or more client computing entities 102. In some embodiments, the external systems may listen for client specific output topics, including individual health record analytics, such as gaps in care, and need to update their analytics either periodically or whenever a patient's Identity (set of constituent records) changes.

Accordingly, the subsequent processing operations performed by the centralized match result serializer computing node(s) can be used to update database state data associated with the data. In some embodiments, the In some embodiments, the database management computing entity 106 performs one or more database management operations based at least in part on the updated database state data. In some embodiments, the database management operations comprise generating database aggregation metadata based at least in part on the updated database state data and generating one or more database query results based at least in part on the database aggregation metadata, where the database query results may be displayed using a database query result user interface that describes the generated database query results.

Other examples of database management operations include: (i) storing permeant and/or temporarily relational database tables that include data determined based at least in part on the one or more query results (e.g., data determined based at least in part on the output of one or more join operations performed based at least in part on the query results), (ii) storing data determined based at least in part on the one or more query results (e.g., data determined based at least in part on the output of one or more join operations performed based at least in part on the query results) as one or more index files for a corresponding database, (iii) setting one or more operational parameters of the corresponding database based at least in part on the one or more query results (e.g., data determined based at least in part on the output of one or more join operations performed based at least in part on the query results), (iv) storing data determined based at least in part on the one or more query results (e.g., data determined based at least in part on the output of one or more join operations performed based at least in part on the query results) as one or more files stored using memoization techniques (e.g., one or more files stored using memoization techniques on one or more cache storage mediums), and (iv) determining one or more new expected query structure for an underlying database associated with the corresponding database based at least in part on the one or more query results (e.g., data determined based at least in part on the output of one or more join operations performed based at least in part on the query results).

An operational example of a database query result user interface 800 is depicted in FIG. 8. As depicted in FIG. 8, the database query result user interface 800 includes database records that are determined to be related to a person whose name is specified by the corresponding query parameters. The query results that are depicted in the database query result user interface 800 may include at least one of the following: (i) one or more query results generated based at least in part on one or more query results generated based at least in part on one or more database records that are recorded to be related to one or more database aggregates that are mapped to the queried person using a search routine that maps queried persons to the database aggregation metadata.

Accordingly, as described above, to address the above-noted challenges associated with efficiency and scalability of performing parallel/concurrent write request processing/matching while maintaining database state consistency, various embodiments of the present invention enable using P concurrent request processor computing nodes to generate concurrent match result determinations for concurrent write requests in a concurrent write request groups, where the concurrent match result determinations are then serialized using a match result serialization queue and processed using a centralized match result serializer computing node to generate match result validation determinations for the concurrent match result determinations. As described herein, while parallel/concurrent write request processing/matching has advantages when it comes to increasing write request processing speed (which is specially significant for real-time and/or near-real-time database update applications), it poses challenges related to maintaining database state consistency. One solution to this challenge is to use database management systems that enable transaction management to ensure transactional serialization. Examples of such database management systems include various relational database management systems (e.g., Oracle, PostgreSQL, and/or the like) that use conventional relational database locking by preventing conflicting decisions via locking record rows and preventing missed matches by locking index locations. However, such solutions introduce deadlock problems. Moreover, database management systems that enable transaction management to ensure transactional serialization are typically limited in terms of performance efficiency and scalability, which often makes the database a key bottleneck for complex software applications. Because of this, many database management systems, such as various document-based database management systems, such as DynamoDB and MongoDB, may limit serialization-based transaction management (e.g., by limiting the number of items that may be updated, their total size, etc.). This means that, many database management systems that offer many performance efficiency and scalability advantages suffer from substantial challenges related to maintaining database state consistency when it comes to parallel/concurrent write request processing/matching.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although, specific terms are employed herein, they are used in a generic and descriptive sense only and not for purposes of limitation.

The invention claimed is:

1. A computer-implemented method comprising:
receiving, by one or more processors, a concurrent write request associated with a concurrent write request group;
determining, by the one or more processors, a selected request processor computing node of a plurality of concurrent request processor computing nodes for the concurrent write request;
generating, by the one or more processors and using the selected request processor computing node, a concurrent match result determination for the concurrent write request, wherein the concurrent match result determination describes a proposed database aggregate for the concurrent write request;
in response to generating the concurrent match result determination, generating, by the one or more processors, an unprocessed match result entry for the concurrent match result determination in a match result serialization queue, wherein: (i) the match result serialization queue describes a serialization ordering of one or more unprocessed match result entries, (ii) each unprocessed match result entry of the one or more unprocessed match result entries corresponds to an unprocessed concurrent match result determination that has not been processed, and (iii) processing a particular unprocessed concurrent match result determination comprises generating a match result validation determination for the particular unprocessed concurrent match result determination; and
initiating, by the one or more processors, the performance of one or more database update operations for a database using the match result serialization queue.

2. The computer-implemented method of claim 1, wherein initiating the performance of the one or more database update operations comprises:
selecting a selected unprocessed match result entry from the one or more unprocessed match result entries of the match result serialization queue in accordance with the serialization ordering;
identifying a recently-processed match result list comprising one or more recently-processed match result entries, wherein: (i) each recently-processed match result entry corresponds to a recently-processed match result determination, and (ii) each recently-processed match result determination has been assigned an affirmative match result validation during a defined recency period before a current processing time;
generating, based at least in part on whether the selected unprocessed match result entry matches at least one of the one or more recently-processed match result entries and using a centralized match result serializer computing node, a serialized match result determination for the selected unprocessed match result entry, wherein the recently-processed match result list is stored on a local storage medium of the centralized match result serializer computing node;
generating, based at least in part on the serialized match result determination for the selected unprocessed match result entry, the match result validation determination for the selected unprocessed match result entry;
in response to determining that the match result validation determination for the selected unprocessed match result entry is a negative match result validation determination: (i) adding a new concurrent write request for the selected unprocessed match result entry to the concurrent write request group, and (ii) removing the selected unprocessed match result entry from the one or more unprocessed match result entries as described by the match result serialization queue.

3. The computer-implemented method of claim 2, wherein initiating the performance of the one or more database update operations comprises:
in response to determining that the match result validation determination for the selected unprocessed match result entry is an affirmative match result validation determination:

adding a new recently-processed match result entry for the selected unprocessed match result entry to the one or more recently-processed match result entries as described by the recently-processed match result list, and removing the selected unprocessed match result entry from the one or more unprocessed match result entries as described by the match result serialization queue.

4. The computer-implemented method of claim 2, wherein the one or more database update operations are performed during a database update iteration of a plurality of data update iterations and, during each database update iteration, a latest database state is modified in accordance with the one or more recently-processed match result entries as described by the recently-processed match result list.

5. The computer-implemented method of claim 2, wherein the defined recency period comprises an estimated database update latency period.

6. The computer-implemented method of claim 5, wherein the defined recency period further comprises an administrator-defined optimal waiting period that is defined based at least in part on a desired database consistency caution level for the database.

7. The computer-implemented method of claim 2, wherein generating the serialized match result determination for the selected unprocessed match result entry comprises:
in response to determining that the proposed database aggregate comprises a particular database record that is assigned to another database aggregate by the one or more recently-processed match result entries as described by the recently-processed match result list, generating the negative match result validation determination for the selected unprocessed match result entry.

8. The computer-implemented method of claim 2, wherein generating the serialized match result determination for the selected unprocessed match result entry comprises:
in response to determining that a database record of the selected unprocessed match result entry matches at least one database record for the one or more recently-processed match result entries as described by the recently-processed match result list, generating the negative match result validation determination for the selected unprocessed match result entry.

9. The computer-implemented method of claim 1, wherein:
the concurrent write request group is selected from G concurrent request groups, and
the G concurrent request groups are collectively processed as one write request unit by the plurality of concurrent request processor computing nodes and are separately processed as G request units by G centralized match result serializer computing nodes.

10. The computer-implemented method of claim 1, wherein the serialization ordering is determined based at least in part on a priority score for each unprocessed match result entry.

11. The computer-implemented method of claim 10, wherein:
the priority score for a particular unprocessed match result entry is generated based at least in part on a temporal priority score for the particular unprocessed match result entry, and
the temporal priority score for the particular unprocessed match result entry is determined based at least in part on a generation time of the unprocessed match result entry.

12. The computer-implemented method of claim 10, wherein:
the priority score for a particular unprocessed match result entry is generated based at least in part on a size-based priority score for the particular unprocessed match result entry, and
the size-based priority score for the particular unprocessed match result entry is determined based at least in part on a count of database records associated with the proposed database aggregate.

13. The computer-implemented method of claim 10, wherein:
the priority score for a particular unprocessed match result entry is generated based at least in part on a group-based priority score for the particular unprocessed match result entry, and
the group-based priority score for the particular unprocessed match result entry is determined based at least in part on a priority score for the concurrent write request group.

14. The computer-implemented method of claim 1, wherein the plurality of concurrent request processor computing nodes comprise/concurrent request processor computing nodes that correspond to P parallel processors of a multi-processor computing entity.

15. The computer-implemented method of claim 1, wherein initiating the performance of the one or more database update operations comprises updating database state data associated with the database.

16. A system comprising memory and one or more processors communicatively coupled to the memory, the one or more processors configured to:
receive a concurrent write request associated with a concurrent write request group;
determine a selected request processor computing node of a plurality of concurrent request processor computing nodes for the concurrent write request;
generate, using the selected request processor computing node, a concurrent match result determination for the concurrent write request, wherein the concurrent match result determination describes a proposed database aggregate for the concurrent write request;
in response to generating the concurrent match result determination, generate an unprocessed match result entry for the concurrent match result determination in a match result serialization queue, wherein: (i) the match result serialization queue describes a serialization ordering of one or more unprocessed match result entries, (ii) each unprocessed match result entry of the one or more unprocessed match result entries corresponds to an unprocessed concurrent match result determination that has not been processed, and (iii) processing a particular unprocessed concurrent match result determination comprises generating a match result validation determination for the particular unprocessed concurrent match result determination; and
initiate the performance of one or more database update operations using the match result serialization queue.

17. The system of claim 16, wherein initiating the performance of the one or more database update operations comprises:
selecting a selected unprocessed match result entry from the one or more unprocessed match result entries of the match result serialization queue in accordance with the serialization ordering;
identifying a recently-processed match result list comprising one or more recently-processed match result entries, wherein: (i) each recently-processed match result entry corresponds to a recently-processed match result determination, and (ii) each recently-processed match result determination has been assigned an affirmative match result validation during a defined recency period before a current processing time;

generating, based at least in part on whether the selected unprocessed match result entry matches at least one of the one or more recently-processed match result entries and using a centralized match result serializer computing node, a serialized match result determination for the selected unprocessed match result entry, wherein the recently-processed match result list is stored on a local storage medium of the centralized match result serializer computing node;

generating, based at least in part on the serialized match result determination for the selected unprocessed match result entry, the match result validation determination for the selected unprocessed match result entry; and in response to determining that the match result validation determination for the selected unprocessed match result entry is a negative match result validation determination: (i) adding a new concurrent write request for the selected unprocessed match result entry to the concurrent write request group, and (ii) removing the selected unprocessed match result entry from the one or more unprocessed match result entries as described by the match result serialization queue.

18. The system of claim 17, wherein initiating the performance of the one or more database update operations further comprises:

in response to determining that the match result validation determination for the selected unprocessed match result entry is an affirmative match result validation determination:

adding a new recently-processed match result entry for the selected unprocessed match result entry to the one or more recently-processed match result entries as described by the recently-processed match result list, and removing the selected unprocessed match result entry from the one or more unprocessed match result entries as described by the match result serialization queue.

19. The system of claim 17, wherein the one or more database update operations are performed during a database update iteration of a plurality of data update iterations and, during each database update iteration, a latest database state is modified in accordance with the one or more recently-processed match result entries as described by the recently-processed match result list.

20. One or more non-transitory computer-readable storage media including instructions that, when executed by one or more processors, cause the one or more processors to:

for each receive a concurrent write request associated with a concurrent write request group;

determine a selected request processor computing node of a plurality of concurrent request processor computing nodes for the concurrent write request;

generate, using the selected request processor computing node, a concurrent match result determination for the concurrent write request, wherein the concurrent match result determination describes a proposed database aggregate for the concurrent write request;

in response to generating the concurrent match result determination, generate an unprocessed match result entry for the concurrent match result determination in a match result serialization queue, wherein: (i) the match result serialization queue describes a serialization ordering of one or more unprocessed match result entries, (ii) each unprocessed match result entry of the one or more unprocessed match result entries corresponds to an unprocessed concurrent match result determination that has not been processed, and (iii) processing a particular unprocessed concurrent match result determination comprises generating a match result validation determination for the particular unprocessed concurrent match result determination; and initiate the performance of one or more database update operations using the match result serialization queue.

\* \* \* \* \*

UNITED STATES PATENT AND TRADEMARK OFFICE
CERTIFICATE OF CORRECTION

PATENT NO. : 12,222,921 B1
APPLICATION NO. : 18/240832
DATED : February 11, 2025
INVENTOR(S) : Paul W. Vaughan Page 1 of 1

It is certified that error appears in the above-identified patent and that said Letters Patent is hereby corrected as shown below:

In the Claims

In Column 38, Line 51, Claim 2, delete "entry;" and insert -- entry; and --, therefor.

In Column 40, Line 23, Claim 14, delete "comprise/concurrent" and insert -- comprise $P$ concurrent --, therefor.

In Column 42, Line 14, Claim 20, delete "for each receive" and insert -- receive --, therefor.

Signed and Sealed this
Twenty-second Day of April, 2025

Coke Morgan Stewart
*Acting Director of the United States Patent and Trademark Office*